United States Patent [19]

Blake et al.

[11] Patent Number: 5,270,919
[45] Date of Patent: Dec. 14, 1993

[54] NETWORK PLANNING TOOL

[75] Inventors: Bruce M. Blake, Freehold; Christopher P. Gilboy, Eatontown, both of N.J.

[73] Assignee: AT&T Bell Laboratories, Murray Hill, N.J.

[21] Appl. No.: 533,260

[22] Filed: Jun. 4, 1990

[51] Int. Cl.$^5$ ...................... G06F 15/22; G05B 23/02
[52] U.S. Cl. ............................ 364/401; 340/825.17; 340/825.07; 370/60.1; 370/62; 379/136
[58] Field of Search ................ 364/401, 419; 340/825.06, 825.07, 825.17; 370/60, 60.1, 62, 94.1, 94.2; 379/136, 220, 221

[56] References Cited

U.S. PATENT DOCUMENTS

| | | | |
|---|---|---|---|
| 3,394,231 | 7/1968 | Hopper et al. | 379/221 |
| 4,191,860 | 3/1980 | Weber | 379/221 |
| 4,707,853 | 11/1987 | Hasegawa | 379/221 |
| 4,862,390 | 8/1989 | Weiner | 364/521 |
| 5,136,690 | 8/1992 | Becker et al. | 379/136 |

OTHER PUBLICATIONS

*Electrical Communication,* vol. 63, No. 3, 1989, "Computer Assisted Network Engineering", C. Guthmann, pp. 279–285.

*Primary Examiner*—Roy N. Envall, Jr.
*Assistant Examiner*—Frantey Poinvil
*Attorney, Agent, or Firm*—Frederick B. Luludis

[57] ABSTRACT

A computer is provided with a network planning facility, which displays in map form a network comprising a plurality of nodes each serving a plurality of subtending nodes, and in which the network is characterized by data stored in the computer. The operation of the planning facility is initiated in response to a user entering an appropriate command. Specifically, responsive to the command, the computer displays a plurality of symbols representing respective ones of the nodes, in which each such symbol is arranged so that it is indicative of the number of traffic terminations at its associated node. The user may then select, in a conventional manner, one of the displayed symbols and then invoke either an automatic mode or a manual mode. In the automatic mode, the computer itself develops a plan for rehoming to another network node individual ones of the subtending nodes associated with the selected node, in which the rehomed subtending nodes are selected based on their having a predetermined traffic relationship with the other node. In the manual mode, it is the user, rather than the computer, which develops the rehoming plan.

20 Claims, 19 Drawing Sheets

NETWORK PLANNING TOOL

FIELD OF THE INVENTION

This invention relates to networks in which subtending nodes exchange traffic with one another via one or more concentration nodes, and more particularly relates to the manner in which a network manager may change a displayed rendition of the network to ascertain the possible effect of such a change on the level of traffic at a particular concentration node.

BACKGROUND OF THE INVENTION

In a large network comprising a plurality of concentration nodes each serving a number of subtending nodes, the case arises in which the capacity of a concentration node may become strained as a result of having to serve an excessive number of subtending nodes. For example, the capacity of a central post office (concentration node) that is located in a growth region may initially be adequate to serve an appreciable number of local post offices (subtending nodes). However, it can appreciated that as the population of the region increases, then the volume of mail that is processed by the central post office will also increase, which may possibly strain the processing capacity of the central post office. In addition, such growth may lead to establishing additional local post offices in the region, each homing in on the central post office, thereby further straining the processing capacity of the central post office.

A like situation may occur in connection with a communications network, in which a so-called toll switch (concentration node) serves a number of local switching offices (subtending nodes). Similarly, the number of telephone calls that the toll switch processes will most likely increase as the population of the region served by the toll switch increases. Moreover, customer demand for new telephone services and the establishment of additional local switching offices each homing in on (connecting to) the toll switch may place an inordinate strain on the processing capacity of the toll switch.

In such situations, a concentration node could fail if its capacity to process traffic (e.g., mail, telephone calls, etc) is virtually exhausted. To prevent such a failure, the capacity problem is typically alleviated by rehoming (reassigning) one or more subtending nodes to one or more other concentration nodes. However, the task of identifying which subtending nodes would be the best candidates for rehoming is not a trivial task. For example, at first glance, it would appear that a subtending node which is the source of a high level of traffic would be a prime candidate for rehoming to another concentration node. However, a large portion of such traffic could be so-called intraoffice traffic, meaning that such traffic flows between subtending nodes located within the same region and, therefore, would still be processed by the concentration node serving that region. Accordingly, rehoming to another concentration node a subtending node that is a source of high level of intraoffice traffic could prove to be ineffective and costly.

In addition, the planning of such rehoming or other changes in the architecture of a network is mostly a manual procedure, which not only consumes an inordinate amount of time, but is also costly.

SUMMARY OF THE INVENTION

A computerized graphics facility is provided which allows a network planner to display on a display a network characterized by predetermined data and then go on to identify the best candidates for rehoming and display the possible effect of changes that the planner makes to the network architecture.

Specifically, once the network is displayed and the planner has selected a concentration node whose capacity needs to be deloaded, then the planner may invoke either an automatic mode or a manual mode. In the automatic mode, the facility itself, and without direction from the planner, identifies those subtending nodes which are the best candidates for rehoming, in which such identification is based on, in accordance with an aspect of the invention, the level of community of interest that a subtending node has with other concentration nodes. In addition, the facility identifies, in accordance with an aspect of the invention, the respective concentration nodes that will receive the identified subtending nodes, in which the identification of such concentration nodes is based on predetermined parameters and relationships between the receiving concentration nodes and the concentration node that is to be deloaded. Following the foregoing, the facility then displays the results of the automatic rehoming procedure to apprise the planner of the possible effect thereof in the event that such rehoming is actually implemented.

In the manual mode, the planner may change particular aspects of the network by entering particular commands to do so. The facility responsive thereto displays the result and displays statistics which apprise the planner of the possible effect that the change, e.g., rehoming, would have on the network.

As an aspect of the invention, the planner may "browse" over a graphics display of a selected concentration node and its associated subtending nodes in order to determine the respective levels of community of interest that a selected subtending node has with the associated concentration node and a number of other concentration nodes. Advantageously then, the planner may identify prior to invoking the aforementioned manual mode the (a) subtending nodes that would be the best candidates for rehoming, and (b) concentration nodes that would receive one or more of those subtending nodes.

BRIEF DESCRIPTION OF THE DRAWINGS

These and other objects and features, together with the operation and utilization of the present invention, will become more apparent from the illustrative embodiment shown in conjunction with the drawing in which.

DETAILED DESCRIPTION

Figure 1:
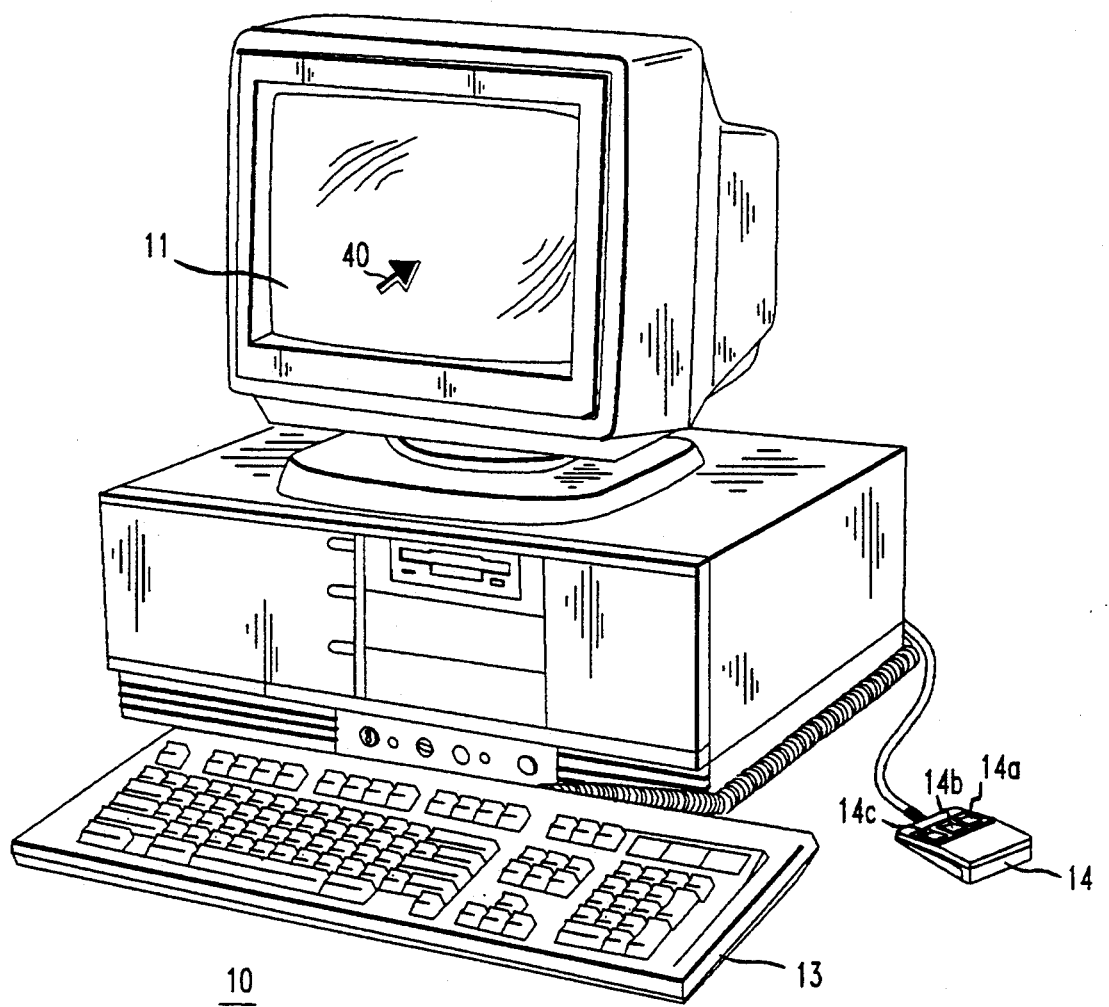
FIG. 1 is a broad block diagram of a computer arrangement in which the present invention may be illustratively implemented.

Computer 10 shown in FIG. 1 operates under a predetermined operating system—illustratively the well-known Unix operating system commercially available from AT&T. Computer 10, which may be, for example, the Sun Workstation Model 4/60 (or Model 4/330) available from Sun Microsystems Inc., includes a screen 11 and keyboard 13 as well as other internal components not explicitly shown in the Figure, such as a hard disk and floppy disk drives for the storage of data and the aforementioned operating system. The convenience of a floppy disk drive allows a user to transfer to the memory of computer 10 (i.e., the hard disk drive) data which characterizes a network of nodes that is of interest to the user. Such data ought to include, inter alia, (a) the identity and capacity of each concentration node as well as the identities of the associated subtending nodes (offices) which connect to the concentration node, and (b) the routes (e.g., transmission paths) which interconnect the concentration nodes. Of particular importance, such data should also include the levels of traffic that a subtending node exchanges with other subtending nodes via the associated concentration node only (i.e., intra-office traffic) and via the associated concentration node and thence via individual other ones of the concentration nodes (i.e., inter-office traffic).

Such levels of traffic are useful in determining, in accordance with an aspect of the invention, the level of community of interest between a subtending node and respective concentration nodes.

Computer 10 also includes keyboard 13 and mouse 14. Mouse 14 and keyboard 13, more particularly, provide a mechanism for the user to input information (data) and instructions to the computer. For example, the user may invoke a particular task identified on the screen by operating mouse 14 in a conventional manner to cause displayed mouse cursor 40 to point to that task. The user may then invoke the task by operating (depressing) a respective one of the mouse keys (buttons) 14a through 14c, as will be discussed below.

As mentioned above, the concentration nodes forming a network could be, for example, shipping hubs such as central or regional post offices or communications network nodes. Such nodes could also be transportation centers such as airports or bus terminals. In a post office network, an end office is a so-called local post office which ships and receives mail via an associated central post office (concentration node). In this sense, the local post office "homes in" on central post office. In a communications network, an end office may be a so-called local central office which transmits and receives telephone calls via an intertoll switch (concentration node).

Of the foregoing applications, the following discussion of the invention will be given in the context of a communications network, such as the AT&T public switched network. As is well-known, the AT&T network comprises a plurality of network nodes, or switching centers, in which each switching center may be, for example, the well-known No. 4ESS switch available from AT&T. Each such switching center serves a group of local central offices associated with a local exchange carrier, e.g., NYNEX, Southern Bell, etc.

Figure 2:
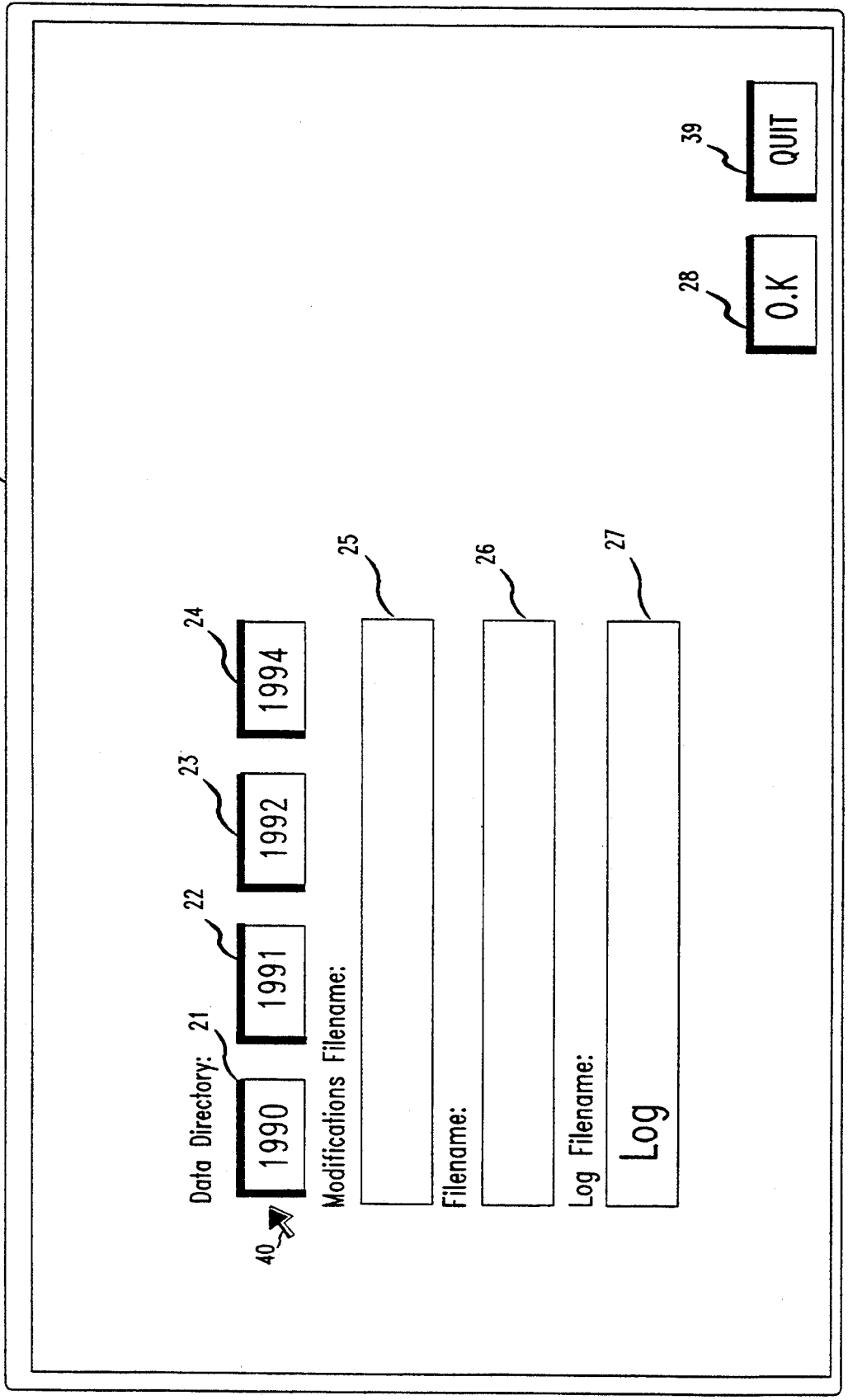
FIGS. 2 through 7 illustrate the manner in which a particular network planning session is invoked.

Specifically, after computer 10 is turned on and has performed some initial tasks, including the "booting" of the operating system from the hard disk unit, a system prompt is displayed on screen 11. At that time the user may enter via keyboard 13 a command to invoke the software which implements the invention in computer 10. In the present illustrative embodiment of the invention, the command is identified by the word "speedy". Computer 10 responsive to the user entering that command displays on screen 11 a number of user options, as shown in FIG. 2.

In particular, data directories 21 through 24 identify data which characterizes the network in relation to respective time periods. In contemplation of the invention, such data may be associated with a base time period, for example, the year 1989, which may be filtered using conventional forecasting algorithms to derive data for succeeding time periods, such as the years identifying data directories 21 through 24, namely, the years 1990 through 1994, respectively. The user selects data associated with a particular displayed time period, e.g., 1990, by pointing mouse cursor 40 to that time period and operating mouse button 14a. Computer 10 responsive thereto displays the selected time period within a high-lighted rectangle.

Display 20 also includes three panels, or windows, 25 through 27 for entering via keyboard 13 the names of respective files for accumulating respective types of transactions entered by the user, or performed by computer 10 over the course of a network planning session. For example, the user may enter in window 25 the name of a file that will be used to store each change (modification) that computer 10 makes in the architecture of a network characterized by data associated with a selected time period, e.g., 1990. If, thereafter, the user changes to data associated with another time period, e.g., 1991, then the user may automatically modify (update) the network architecture characterized by the latter data using the changes stored in the modifications file identified by the file name that the user priorly entered in window 25 for the 1990 data.

The user may exclude from an automatic planning mode performed exclusively by computer 10 (discussed below in detail) one or more network facilities by entering in window 26 the file name containing the identity of each of those facilities. In addition, the user may save in a so-called log file that the user identifies in window 27 a copy of the planning instructions that the user enters over the course of a network planning session.

Figure 3:
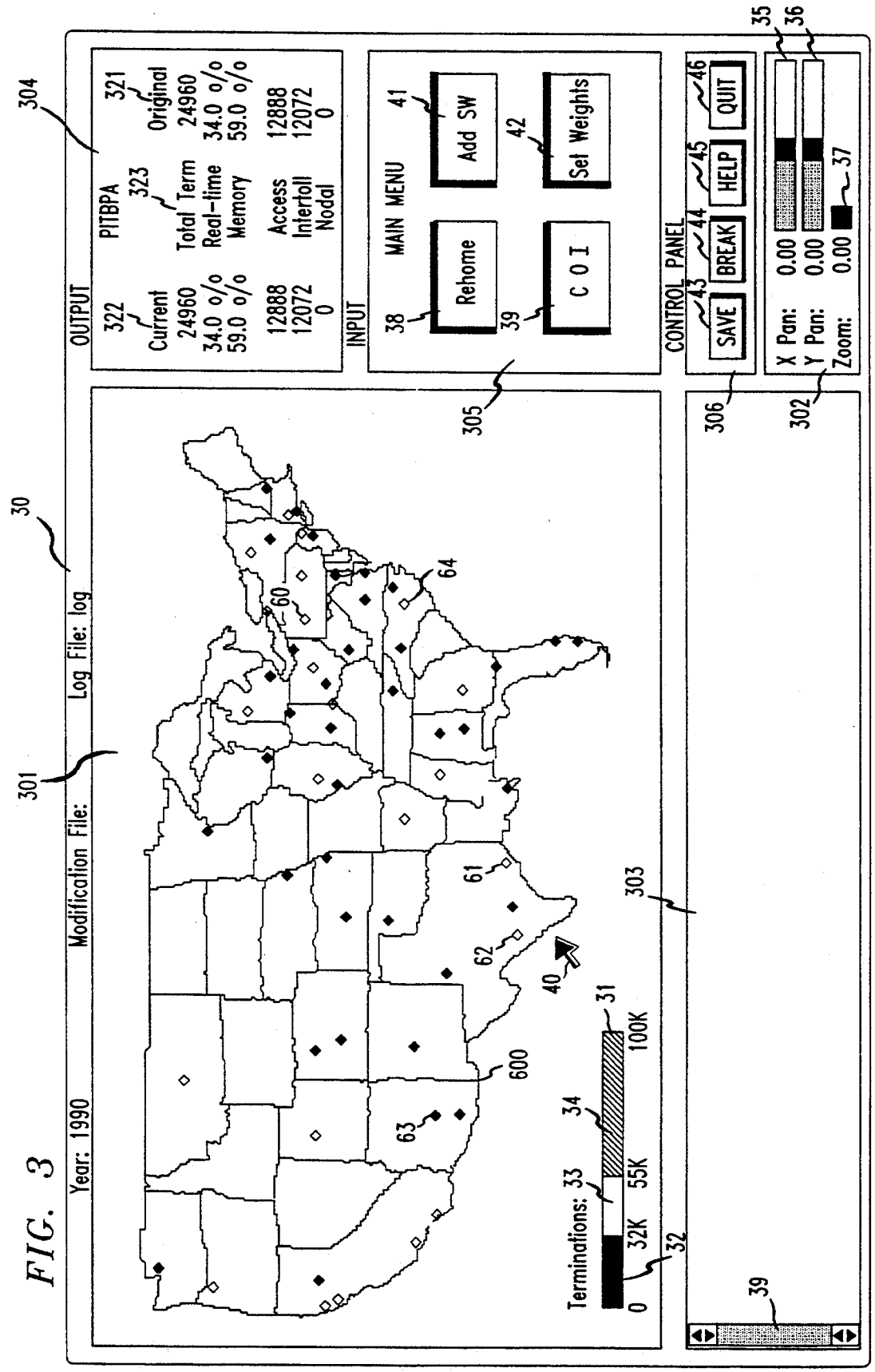

Display 30 also includes O.K. and Quit buttons 28 and 29, respectively, which the user may select to either continue or quit the planning session. Assuming that the user elects to continue the session by pointing mouse cursor 40 to button 28 and operating mouse button 14a, then, computer 10 responsive thereto brings up on screen 11 display 30, as shown in FIG. 3.

It is seen that display 30 is divided into a number of panels (windows) 301 through 306. In panel 301, computer 10 displays a symbol—illustratively a diamond shaped symbol—to represent a respective concentration node forming the network characterized by the selected data, and positions each such symbol in relation to its respective location within a map 600 of the country that the associated network happens to be located. In the present illustrative example, the country is the United States. It is noted that the states of Alaska and Hawaii are not displayed within map 600, since their location in relation to the mainland of the U.S. would cause them to be displayed off of screen 11. However, the user may display those states by reducing the display size of the U.S. mainland in panel 301, as will be explained below.

In addition, each of the concentration nodes, e.g., node 61, is displayed in one of illustratively three colors, as determined by the setting of meter 31, to indicate their respective nodal capacity levels, i.e., the number of so-called trunk terminations. It is seen that meter 31 is labeled "Terminations" and is segmented into a number of bands—illustratively three bands. In an illustrative embodiment of the invention, the three bands 32 through 34 are color coded green, yellow and red, respectively. In the Figure, band 32 is filled in to represent the color green, and band 33 is blank (unfilled) to represent the color yellow. The diagonal lines in band 34 are used to represent the color red. Such color coding corresponds with the color coding of the displayed symbols representing respective concentration nodes. For example, concentration node (symbol) 61 is colored green to indicate that the number trunk terminations at that node is within the range of 0 to 32,000, which corresponds to the range of band 32. Similarly, node 62 (63) is colored yellow (red) to indicate that the number of trunk terminations at that node is within the range of 32,000 (55,001) to 55,000 (100,000).

In accordance with an aspect of the invention, the user may change the range of terminations represented by any one of the bands 32 through 34. For example, the user may increase the range of band 33 to illustratively 75,000 terminations by pointing mouse cursor 40 at a point within band 34 representing that number and operating mouse button 14a. Computer 10 responsive thereto would increase the range of band 33 to 75,000 terminations and redisplay in the color yellow those concentration nodes whose number of terminations fall within the new range of band 33. Advantageously then, the user may decrease (or increase) the range of a band, e.g., band 34, so that only particular concentration nodes are displayed in the desired color, e.g. red.

(It is noted that meter 31 may be changed to represent other nodal metrics that measure fixed resources such as a concentration node's real-time processor capacity or memory capacity.)

The user may reposition map 600 within panel 301 by operating one or more of the slider tools 35 through 37 shown in panel 302. For example, the user may move map 600 in the x-direction (right or left) by operating tool 35, or the y-direction (up or down) by operating tool 36. The user, on the other hand, may magnify (zoom) map 600 by operating tool 37. The user operates each of these tools by pointing mouse cursor 40 thereto and operating (pressing) mouse button 14a. To accelerate x and y directional movement, the user may position mouse cursor 40 at a desired point on map 600 and operate mouse button 14b. Computer 10 responsive thereto will redisplay map 600 and center it at the selected point within panel 301.

As will be shown below, computer 10 displays in panel 303 a list of transactions that it performed automatically or at the direction of the user. The user may scroll through the list, either in the forward or backward direction, by operating scroll tool 39 in a conventional manner.

When the user points mouse cursor 40 to one of the node symbols displayed in map 600 and operates mouse button 14a, then computer 10 displays in panel 304 labeled "OUTPUT" particular information associated with that node. It is seen that as a result of the user selecting one such node symbol e.g., node 64, computer 10 has displayed the identity 320 of that node along with two columns of data 321 and 322 associated with that node.

Specifically, column 321, labeled "Original", is the initial 1990 data for the data values defined in column 323, and column 322 displays the current status of the original data, as will be discussed below. It is seen from the Figure that the data values are the same for both columns 321 and 322, which include (a) the total number of trunks terminating at the selected concentration node, (b) the level of real-time processing used by the selected node, and (c) the amount of memory that the node has thus far used. Lines 327 through 329 divides the total number of terminations into three respective categories, namely, access, intertoll, and nodal.

Panel 305 displays a Main Menu comprising buttons 38, 39, 41 and 42. Button 38 labeled "Rehome" is used to invoke a planning session that allows a user to assess the effect of rehoming (i.e., reassigning) a subtending node (e.g., an end office, access tandem, toll switch, etc.,) from a selected concentration node (relieved node) to another concentration node (relief node). As mentioned above, such rehoming is typically performed to relieve the traffic load at the selected concentration node. Button 39 labeled "COI" (Community of Interest) causes computer 10 to display in map 600 the subtending nodes served by a concentration node selected by the user. The user may then "browse" among the displayed subtending nodes to determine the level of community of interest that a particular subtending node enjoys with its associated concentration node and individual ones of the other concentration nodes, as will be shown below. Button 42 labeled "Set Weights", allows the user to change the values (weights) of a number of parameters that are used in an automatic rehoming feature, as will be discussed below in detail. Button 41 labeled "Add SW" allows the user to add a new concentration node to the network displayed in map 600, as will be shown below.

What is meant herein by the term "Community of Interest" (COI) is the relationship that a subtending node has with its associated concentration node and individual other ones of the concentration nodes That is, COI is taken to mean a measure of the amount of traffic (e.g., mail, telephone calls, etc.) that a subtending node exchanges with another subtending node in which both of those subtending nodes are served by the same concentration node, i.e., COI is a measure of intraoffice traffic; and is also taken to mean a measure of the amount of traffic that a subtending node exchanges with another subtending node in which the other subtending node is served by another concentration node, i.e., COI is also a measure of interoffice traffic. Stated in another way, COI is a measure of the amount of traffic (e.g., mail, telephone calls, etc.) that uses a subtending node as an originating or terminating node and uses the concentration node as the last or first concentration node, respectively. In rehoming (reassigning) subtending nodes from one concentration node to another, it is advantageous to choose subtending nodes having a low COI with their associated concentration node and a high COI with another, receiving (relieving) concentration node. Advantageously, then, this increases the intraoffice traffic in the network and decreases interoffice traffic (i.e., traffic between concentration nodes).

Accordingly, the total resources required to carry all traffic is decreased.

Computer 10 displays in panel 306 labeled CONTROL PANEL four buttons 43 through 46, which the user selects to invoke conventional features. For example, button 43 allows the user to save changes that were made to the network during a planning session; button 44 allows the user to exit the current feature and return to the main menu; button 45 causes computer 10 to invoke a "help" feature, and button 46 allows the user to quit.

With the foregoing in mind, we now turn to a discussion directed to the way in which the user may employ our invention to readily replan the architecture of the displayed network and be apprised of the potential results of such replanning.

Figure 4:
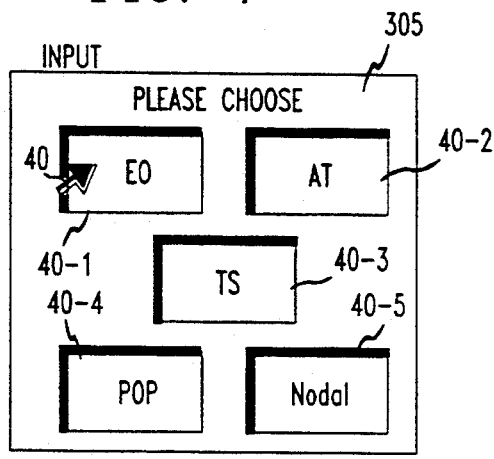

Specifically, the user invokes a network planning session by pointing mouse cursor 40 to Rehome button 38 and operating mouse button 14a. Computer 10 responsive thereto displays in panel 305 a number of buttons 40-1 through 40-5 associated with respective network switching facilities (subtending nodes), as shown in FIG. 4. As is well-known, one or more levels of such switching facilities may be involved in the processing (switching) of a telephone call, which facilities connect to a concentration node. In particular, a local switching office (End Office) represented by button 40-1 is at the lowest level of such processing and is succeeded by, in turn, an Access Tandem (AT) office, a Toll Switch (TS) and a so-called Point of Presence (POP) as represented by buttons 40-2 through 40-4. Nodal button 40-5 represents a separate, independent communications facility, such as a so-called PBX, which may connect directly to a concentration node.

At this point, the user may select any one of the aforementioned facilities as the subtending nodes that may be candidates for rehoming from their associated concentration node to at least one other concentration node.

In the ensuing discussion it is assumed that the user is faced with relieving the level of traffic at a particular concentration node and has elected to rehome end office nodes (subtending nodes) away from that concentration node to one or more other concentration nodes. It is to be understood of course that the user may elect to rehome any one of the other facilities identified in panel 305 of FIG. 4, rather than end offices. It is also understood that the ensuing discussion pertains equally well to those other facilities. That is, the way in which the user rehomes an end office node, in accord with the invention, pertains equally well to the way that the user would rehome, for example, an access tandem (AT) node.

Figure 5:
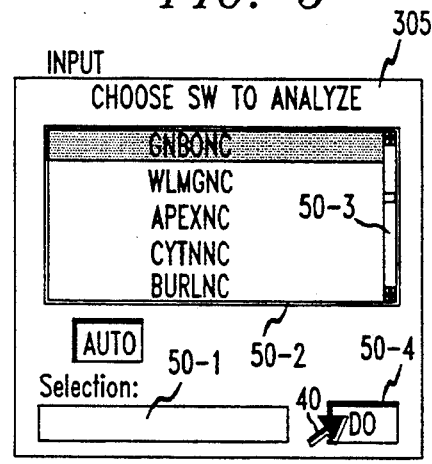

Accordingly, then, to invoke a planning session involving end offices, all that the user needs to do is to point mouse cursor 40 at EO button 40-1 and operate mouse button 14a. Computer 10 responsive thereto displays in panel 305, in the form of a scrollable list, the identities of the various concentration nodes, as shown in FIG. 5. At this point, the user may enter the identity of the concentration node whose traffic level is to be relieved, and may do so in one of a number of different ways. For example, the user may (a) point mouse cursor 40 at the associated symbol in map 600 (FIG. 3) representing that concentration node and operate mouse button 14a, (b) "type in" via keyboard 13 the identity, which then appears in window 50-1, or (c) highlight the identity after it has been scrolled into window 50-2. The user may scroll through the aforementioned list in an upward or downward direction by operating scroll bar 50-3 in a conventional manner. It is noted that when the user highlights the identity of a concentration node, computer 10, in turn, displays in panel 304 associated data of the type shown in panel 304 of FIG. 3.

Figure 6:
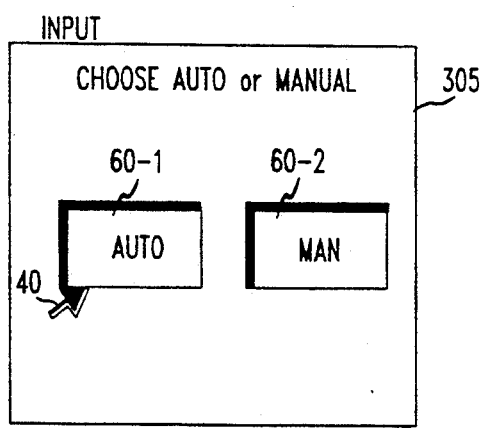

It is seen from FIG. 5 that the user has highlighted one such identity, namely GNBONC (GREENSBORO, N.C.). Assuming that GNBONC is the identity of the concentration node that is of interest to the user, then all that the user needs to do to complete the selection of that identity is to point mouse cursor 40 at "DO" button 50-4 and operate mouse button 14a. Computer 10 responsive thereto displays in panel 305 two option buttons 60-1 and 60-2 labeled "AUTO" and "MAN", respectively, as shown in FIG. 6. In particular, button 60-1 is used to invoke an automatic planning mode, in which computer 10 itself, and without direction from the user, automatically chooses the end offices that are to be rehomed from the selected concentration node and chooses the concentrations that will receive those end nodes, as will be discussed below.

Figure 7:
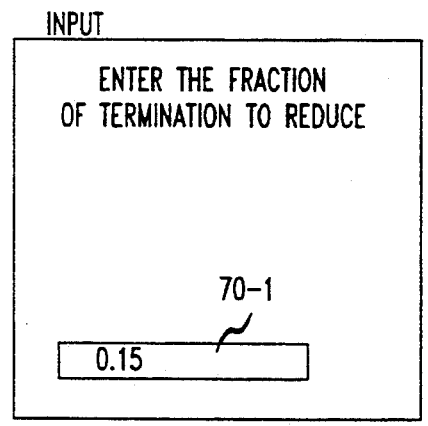

Button 60-2, on the other hand, is used to invoke a manual mode, in which computer 10 performs such rehoming at the direction of the user, as will be explained below. Assuming that the user selects the AUTO mode, then computer 10 displays in panel 305 a request for entry of the value by which the selected concentration node is to be deloaded, as shown in FIG. 7. It is assumed that the user desires to decrease the number of terminations, and hence the level of traffic, at the selected concentration node by a predetermined value—illustratively 15% (i.e., 0.15). When the user enters that value in window 70-1 using keyboard 13 and then presses the keyboard 13 enter key, computer 10, in accordance with a rehoming algorithm (discussed below) automatically rehomes to other relief concentration nodes one or more of the subtending nodes connecting to the selected concentration node. That is, the rehoming algorithm identifies, in accordance with an aspect of the invention, those subtending nodes having a high level of community of interest with other ones of the concentration nodes, and then goes on to rehome each such end node and displays the results on screen 11, as shown in FIG. 8.

Figure 8:
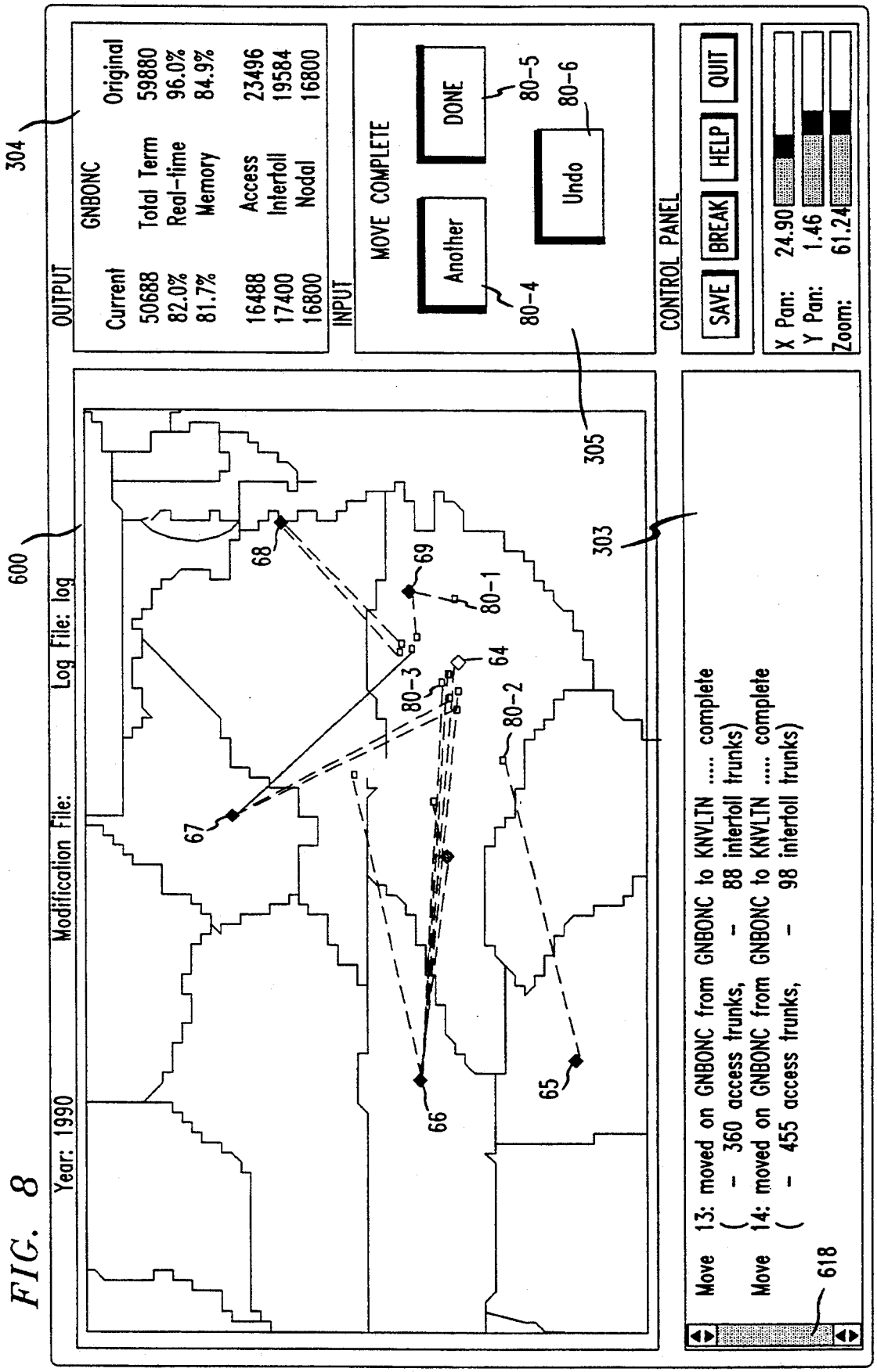
FIG. 8 illustrates the results of a planning session employing the automatic mode.

It is seen from FIG. 8, that computer 10 has magnified the area of map 600 containing the selected concentration node 64, and has rehomed to other concentration nodes 65 through 69 individual ones of the subtending (end) nodes that originally connected to concentration node 64. Such rehoming is represented in the Figure by dashed lines. For example, end nodes 80-1 and 80-2 have been rehomed to concentration nodes 69 and 65, respectively. In addition, individual ones of the end nodes collectively designated 80-3 have been rehomed to respective ones of the concentration nodes 66 and 67.

It is also seen from the Figure that computer 10 has displayed in panel 303 the moves that were performed over the course of the automatic rehoming session. Each such move identifies, inter alia, a respective end node and identifies the concentration node that received that end node. (The user may display in panel 303 the other moves performed by computer 10 by operating scroll bar 618 in the conventional manner.)

The statistics displayed in panel 304 summarize the results of the automatic rehoming session, and indicate that the number of terminations at selected concentration node 64 would decrease by approximately 9,000 terminations if the rehoming is implemented. Panel 304 also indicates that the real-time capacity and memory requirements of node 64 would improve by approximately 14% and 3%, respectively, and that the number of access and intertoll trunks at node 64 would decrease substantially.

Computer 10 has also displayed in panel 305 three buttons 80-4 through 80-6 labeled respectively Another, DONE and Undo. These buttons allow the user to (a) continue deloading the selected concentration node, (b) retain the results of the automatic rehoming and discontinue deloading the selected contraction node, or (c) undo the results of the automatic rehoming, respectively.

As mentioned above, the user may select button 42 shown in FIG. 3 to set the values of weights associated with predetermined parameters that are used in the automatic mode. The value of a particular weight indicates the level of importance of the associated parameter in relation to the level of importance of the other parameters.

Figure 9:
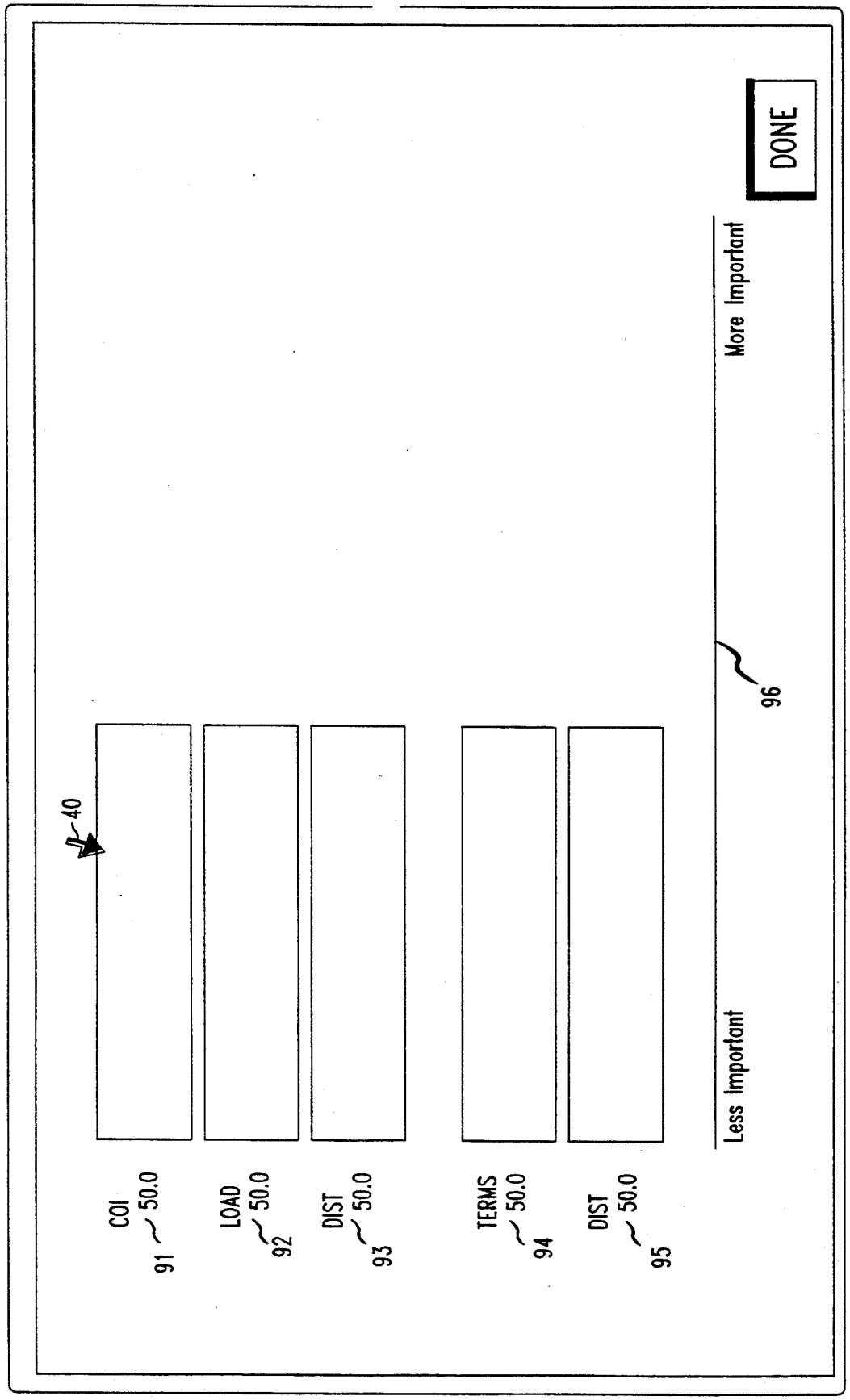
FIG. 9 illustrates the manner in which a planner may change particular parameters employed in the automatic mode.

Specifically, if the user selects button 42, then computer 10 brings up on screen 11 five slider bars, as shown in FIG. 9. Three of the slider bars 91 through 93 are used to set the weights of parameters COI, Load and Dist associated with the subtending nodes, e.g., end nodes. COI 91, as mentioned above, pertains to the community of interest parameter; Load 92 pertains to the level of traffic exchanged between a subtending node and its respective concentration node; and Dist 93 pertains to the distance between a subtending node and the relief concentration node. The remaining slider bars are used to set the weights of parameters TERMS 94 and DIST 95 associated with the selected concentration node. TERMS 94 pertains to the number of terminations at the concentration node and DIST 95 pertains to the distance between the selected concentration node and a relieving concentration node.

The user may set the weight of a parameter, e.g., COI 91, by pointing mouse cursor 40 at a point along the width of the associated slider and operating mouse button 14a. The importance of the weight of a parameter in relation to the other parameters increases from left to right along the width of the associated slider, as shown by scale 96. Thus, if the user sets the weight of COI to a point in the right-hand portion of slider 91 and sets the weight of LOAD to a point in the left-hand portion of slider 92, then computer 10 will consider COI to be the more important parameter during a respective automatic rehoming session. The value of 50.0 shown to left of each such slider is a default value.

Figure 10:
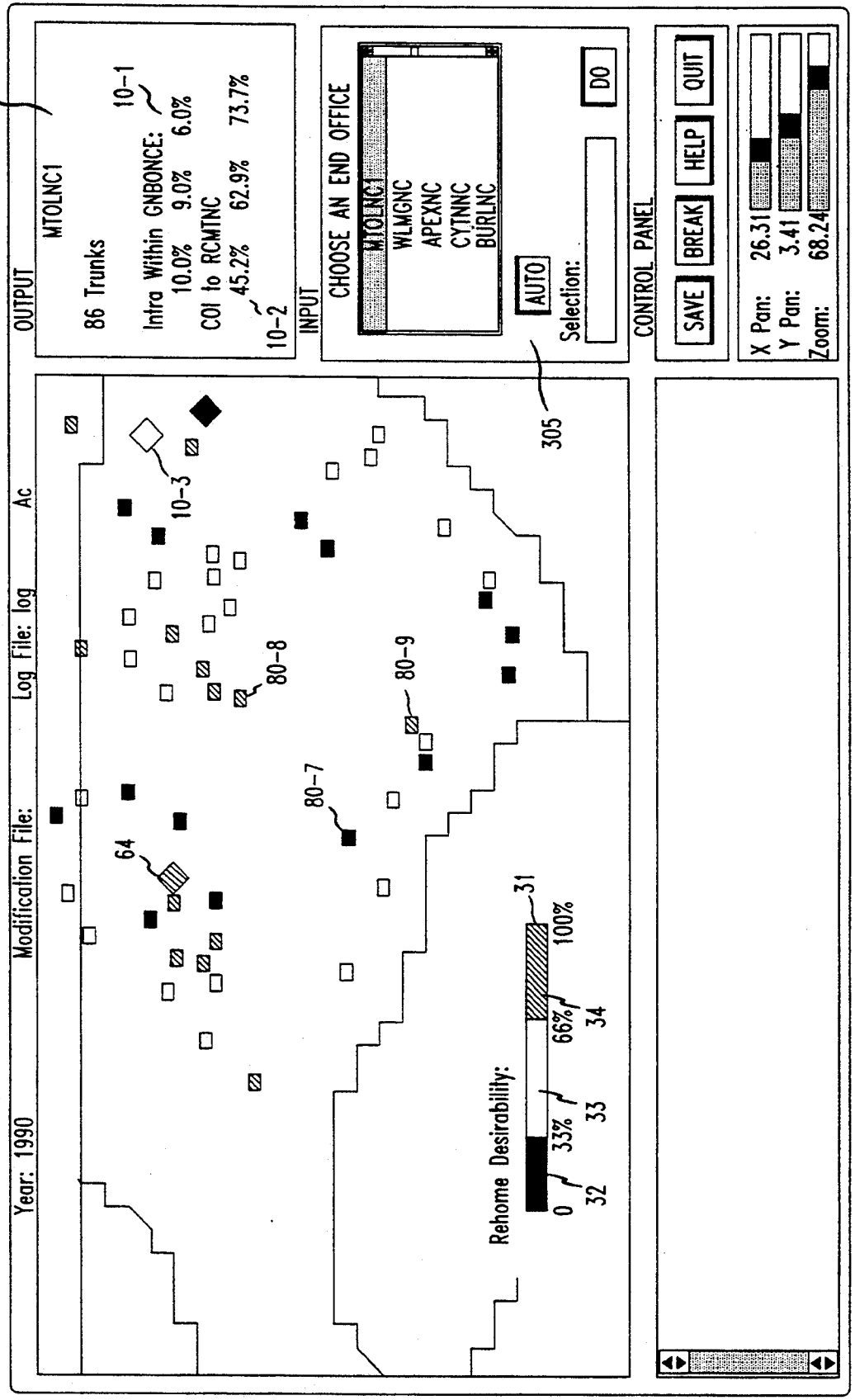
FIGS. 10 through 12 illustrate a planning session employing the manual mode and the results produced by such planning.

As mentioned above in connection with FIG. 6, a planning session may be conducted in either an automatic mode, as just discussed, or a manual mode. As also mentioned above, the user may invoke the manual mode by pointing mouse cursor 40 to button 60-2 and operating mouse button 14a. When the user does so, computer 10 displays in panel 305 the names of the various concentration nodes, as previously discussed in connection with FIG. 5. Assuming that the user selects as the relief concentration node RCMTNC (Rocky Mount, N.C.), then computer 10 displays that node as well as all of the subtending nodes which connect thereto, as shown in FIG. 10. In FIG. 10, the selected concentration node 64 as well as receiving concentration node 10-3 are represented by a clear diamond. The subtending nodes (for example end nodes 80-7 through 80-9) are represented by predetermined symbols—illustratively squares—with each such symbol displayed in one of illustratively three colors, as determined by the respective settings of meter 31, which is now labeled "Rehome Desirability". In keeping with the color scheme shown in FIG. 3 for meter 31, bands 32 through 34 are color coded green (filled in), yellow (blank) and red (diagonal lines), respectively. This color coding means, in the context of the current planning session, in which the selected rehoming parameter is community of interest (COI), that those subtending nodes displayed in the color green, e.g., node 80-7, have the lowest level of COI, and, therefore, are considered to be the least desirable candidates for rehoming. Those subtending nodes displayed in the color red, e.g., node 80-8, have the highest level of COI, and, therefore, are the most desirable candidates for rehoming.

Computer 10 also identifies in panel 305 the subtending nodes that connect to the selected node 64. In the manner discussed above, the user may scroll through such identities and highlight them one at a time. Computer 10 responsive to such highlighting displays in panel 304 various statistics associated therewith. It is seen in the Figure that the user has highlighted the subtending node identified as MTOLNC1 and that computer 10 has displayed in panel 304 statistics associated with that node. Such statistics include, for example, (a) the number of trunks (e.g., 86) associated with the selected concentration node that connect to subtending node MTOLNC1; and (b) the levels of COI (collectively designated 10-1) between node MTOLNC1 and the selected concentration node. The COI levels 10-1 include 10%, 9% and 6% corresponding to respective time periods, namely morning, noon and evening.

Computer 10 also displays the levels of COI (collectively designated 10-2) between node MTOLNC1 and receiving concentration node 10-3 (RCMTNC), which correspond with similar time periods.

Figure 11:
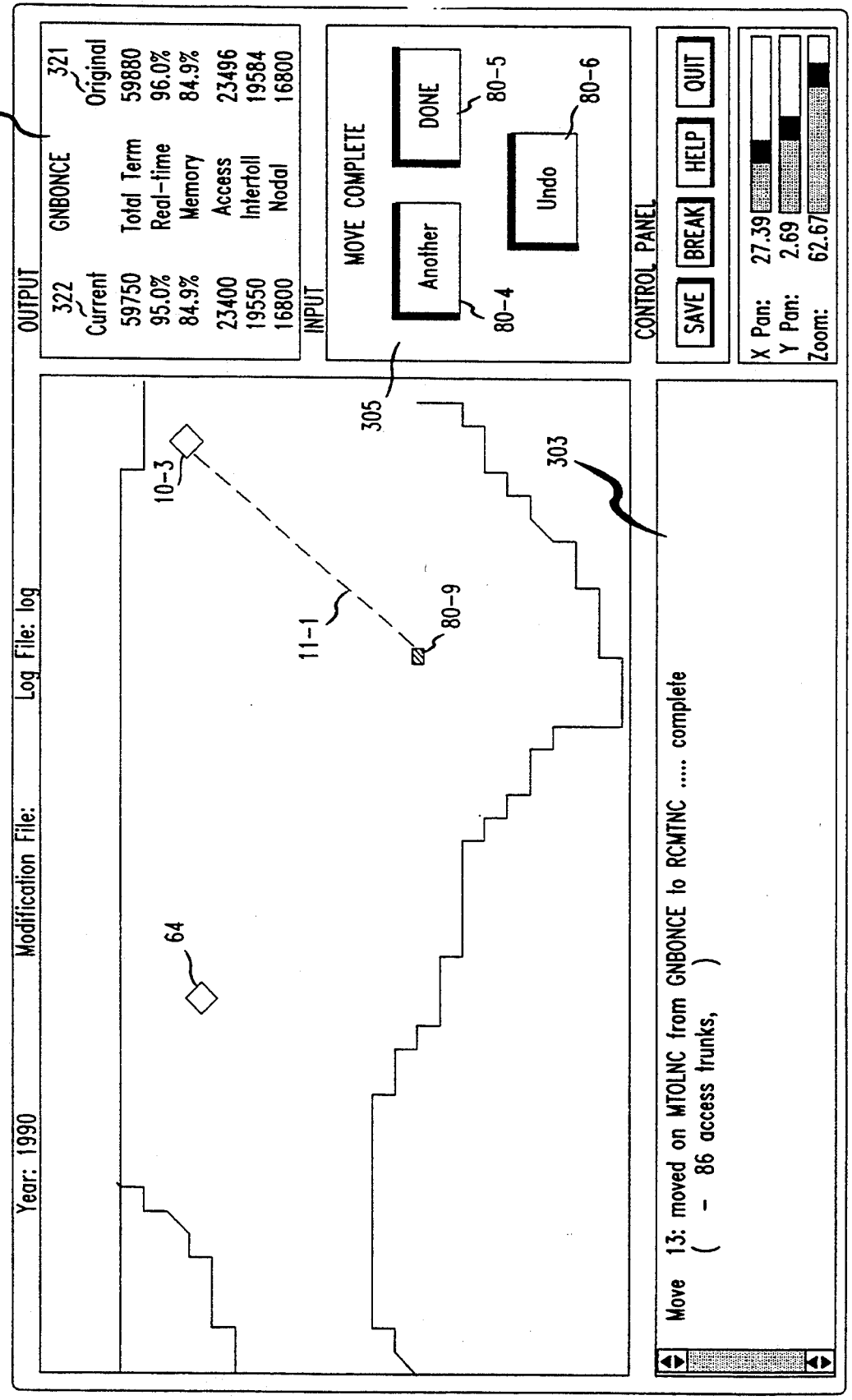

Because the values of COI levels 10-2 are considerably larger than the values of COI levels 10-1, the user may find it desirable to rehome subtending node MTOLNC1 to receiving concentration node 10-3 as a possible way of relieving the load at the selected concentration node 64. If the user elects to do so, then all that the user needs to do is to point mouse cursor 40 at DO button 50-4 and operate mouse button 14a. Computer 10 responsive to that action displays the possible effect of the rehome, as shown in FIG. 11.

In particular, computer 10 displays in map 600 the rehome by connecting to receiving concentration node 10-3 (RCMTNC) via line 11-1 subtending node MTOLNC1 80-9. In addition, computer 10 notes that fact in panel 303. The possible effect of the rehome as it pertains to the selected concentration node 64 is displayed in panel 304. The data shown under column 321 is the original data associated with node 64 and the data under column 322 shows how the original data would change as a result of the rehome.

Figure 12:
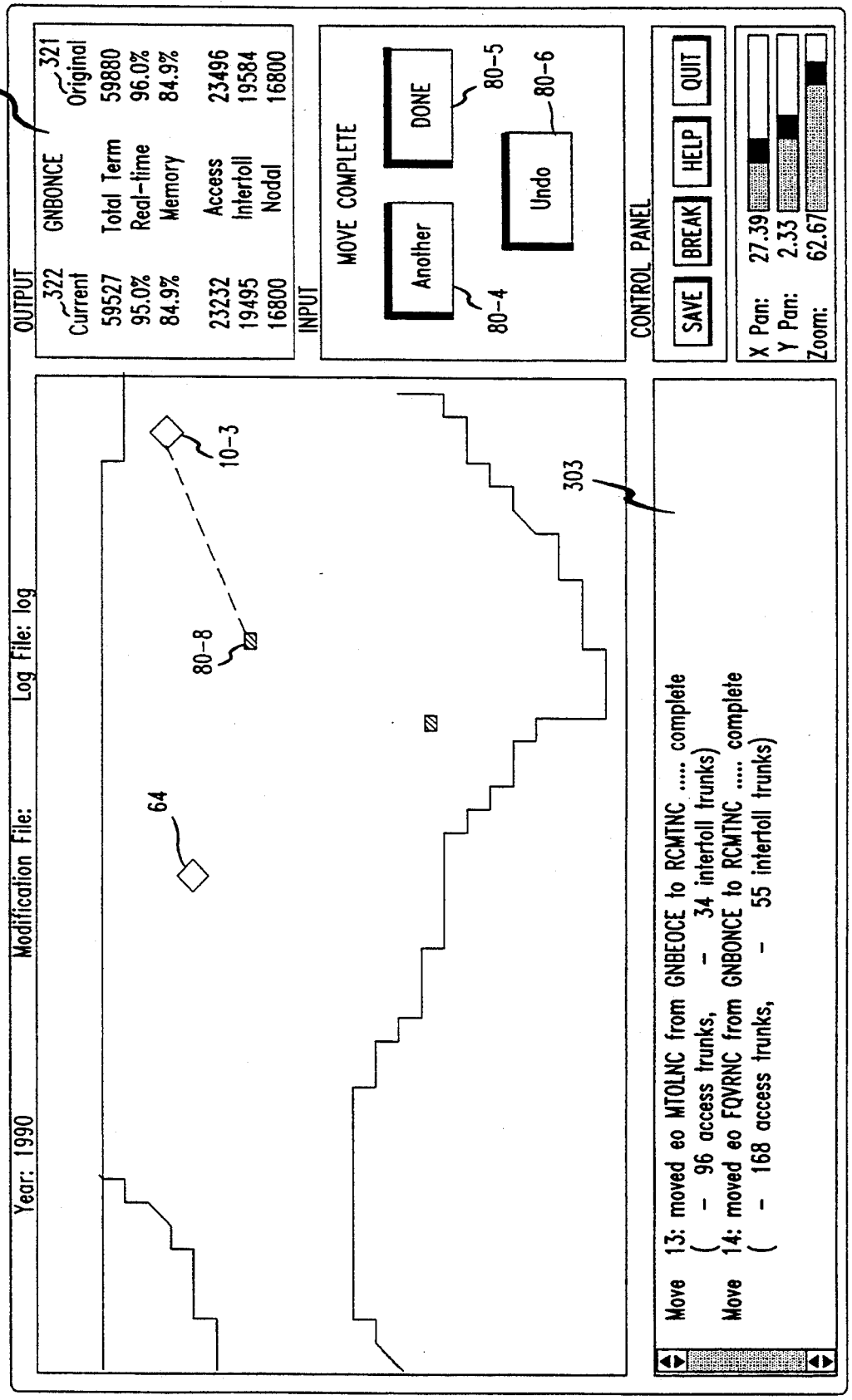

The user may either end the planning session or undo the rehome by respectively selecting DONE button 80-5 or Undo button 80-6 displayed in panel 305. Alternatively, the user may continue the planning session and rehome another subtending node to receiving concentration node 10-3 by selecting button 80-4. If the user selects the latter button then computer 10 redisplays FIG. 6, in the manner described above, to allow the user to select, for example, the automatic mode. Assuming that the user continues in the manual mode, then the computer redisplays FIG. 10. Also assuming that the user selects, in the manner discussed above, subtending node 80-8 (known as FQVRNC) as the node that is to be rehomed, then computer redisplays FIG. 11. However, in this instance, computer 10 shows subtending node 80-8, rather than subtending node 80-9, as being rehomed to concentration node 10-3, as shown in FIG. 12.

In addition, computer 10 displays in panel 303 the latest rehoming action and displays in panel 304, under column 322, the cumulative effect of the latest rehome. As mentioned above, the user may go on to rehome another subtending node, end the planning session or undo the latest rehome by selecting button 80-4, 80-5 or 80-6, respectively, in the conventional manner.

Figure 13:
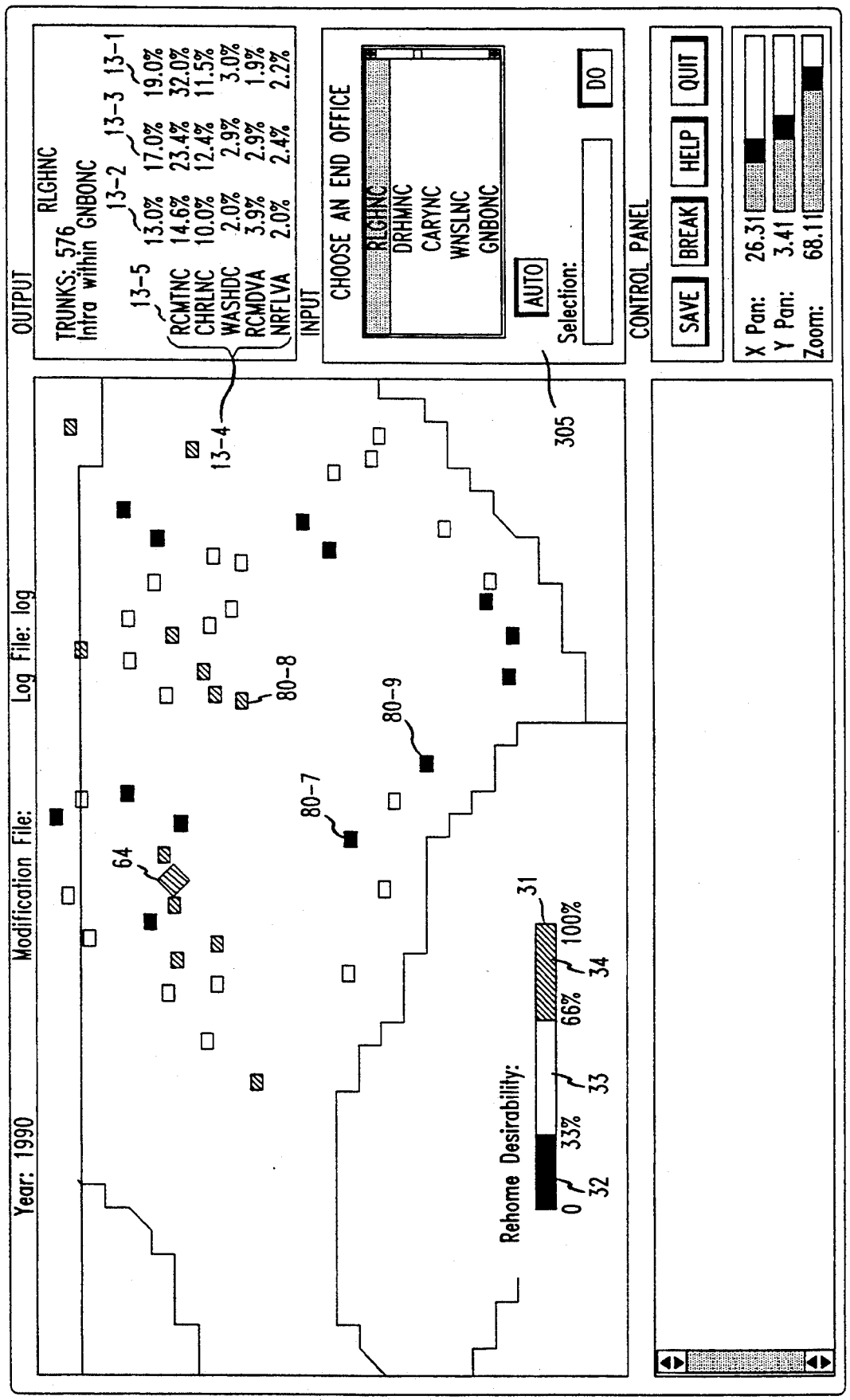
FIG. 13 illustrates an example of a so-called "browse" mode.

As discussed above in connection with FIG. 3, the user has the option of selecting from the main menu COI button 39. If the user selects that button, then computer 10 displays FIG. 4 in panel 305, so that the user may select a particular class of subtending nodes, as discussed above. Assuming that user select class EO, then computer 10 displays FIG. 5 in panel 305 so that the user may identify the desired concentration node. Assuming in the present instance that the user identifies, in the manner discussed above, concentration node 64, then computer 10 displays that node, the associated subtending nodes and statistics pertaining to the community of interest between a selected (highlighted) subtending node and a number of other concentration nodes—illustratively five—, as shown in FIG. 13. It is seen that except for the data displayed in panel 304, FIG. 13 is essentially similar to FIG. 10.

Specifically, the display of FIG. 13, allows the user to "browse" (scroll) among the displayed subtending nodes and have the associated COI data displayed in panel 304. As mentioned above, the user may select a node using one of a number of selection methods. It is seen from FIG. 13, that the user has highlighted a subtending node identified as RLGHNC, and, in response to that selection, computer 10 has displayed in panel 304 the associated COI data. Line 13 of the COI data indicates the levels of community of interest between the highlighted subtending node and concentration node 64 for predetermined time periods (e.g., morning 13-2, noon 13-3 and evening 13-1). The five lines collectively designated 13-4 indicate, for similar time periods, the levels of community of interest between the highlighted subtending node and other ones of the concentration nodes identified under column 13-5. Once the user has been apprised of such levels of COI, then the user may invoke the manual rehoming mode (discussed above) and determine the possible effect of rehoming from the associated concentration node to a desired relief node, such as relief concentration node 10-3 (shown in FIG. 10) one or more subtending nodes.

As another aspect of the invention, the user may advantageously add a concentration node to the network displayed in map 600, and then enter a network planning session to determine the possible effect that the addition may have on the network. Specifically, the user may add another concentration node (switch) by (a) selecting button 41 labeled ADD SW (switch) shown in FIG. 3, (b) then entering via keyboard 13 the identity of the new switch, and (c) then pointing mouse cursor 40 to the point on map 600 at which the new switch is to be located and operating mouse button 14a. Computer 10 responsive thereto redisplays map 600 to include the newly added concentration node disposed at the desired location. In addition, computer 10 adds to the data characterizing the network the data associated with the newly added concentration node, which data is essentially composed of the associated identity and location, since the number of terminations and subtending nodes associated therewith would be zero.

For example, assume that the user locates the new switch in Key West, Fla. and identifies the switch as KYWSFL. Also assume that the user then goes on to select the automatic rehoming mode identifying a concentration node located in Miami, Fla. as the node that is be deloaded. Faced with that state of facts, computer 10 would then deload the Miami concentration node by rehoming one or more of its subtending nodes to the newly added node, as shown in FIG. 14.

Figure 14:
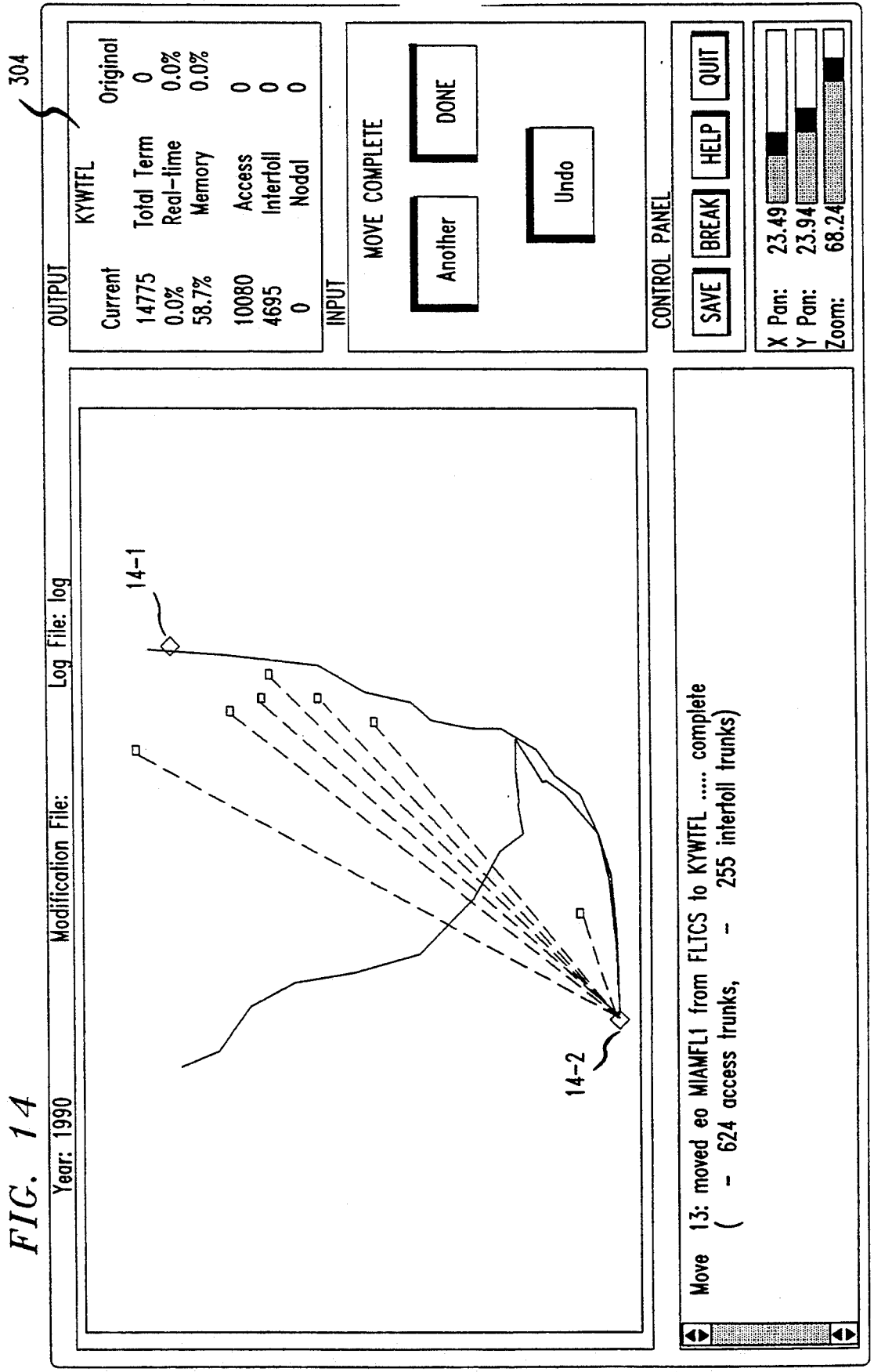
FIG. 14 illustrates the results of adding a concentration node to the network of FIG. 3 and then invoking the automatic mode to relieve the loading at a particular concentration node by rehoming associated subtending nodes.

It is seen from FIG. 14, that computer 10 has deloaded concentration node 14-1 located in Miami by rehoming to newly added node 14-2 a number of subtending nodes priorly associated with node 14-1. In addition, computer 10 has displayed in panel 304 statistics indicative of the possible effect of such rehoming.

We now turn to a discussion of a logical flow diagram (flowchart) of the program which implements our invention in computer 10.

Figure 15:
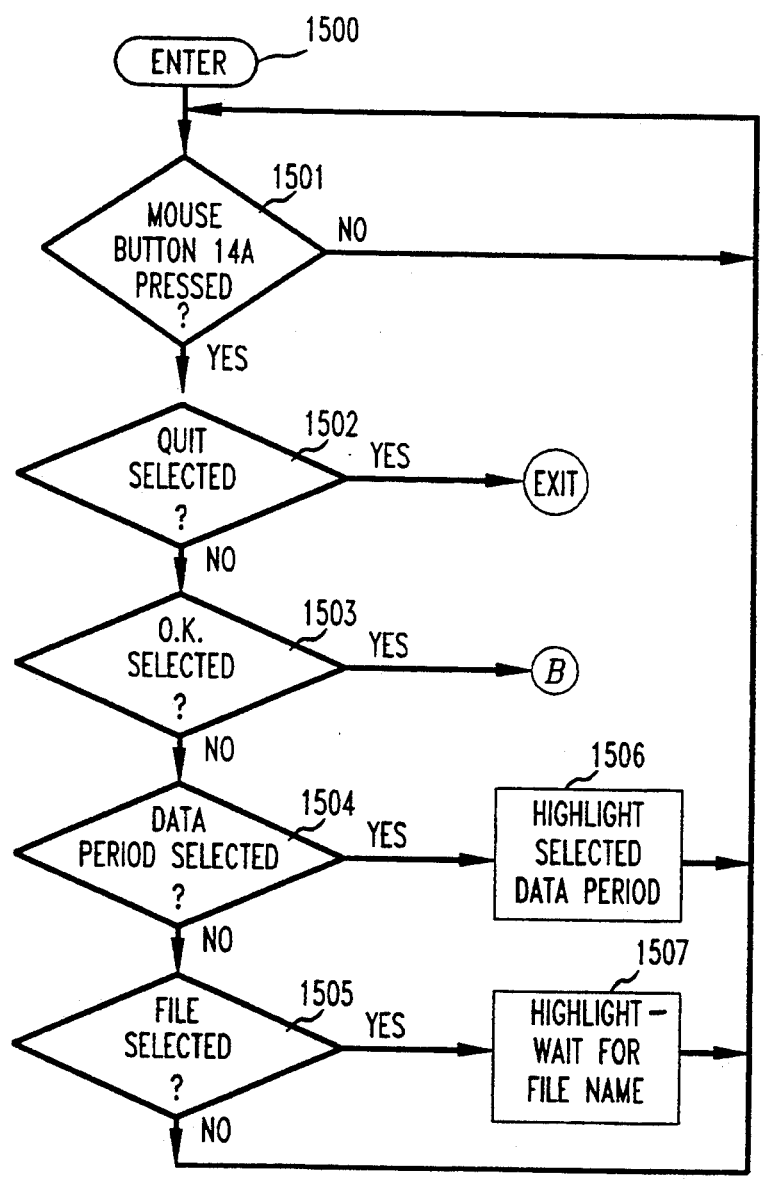
FIGS. 15 through 22 are functional flow charts of the program which implements the invention in the computer of FIG. 1.
Figure 16:
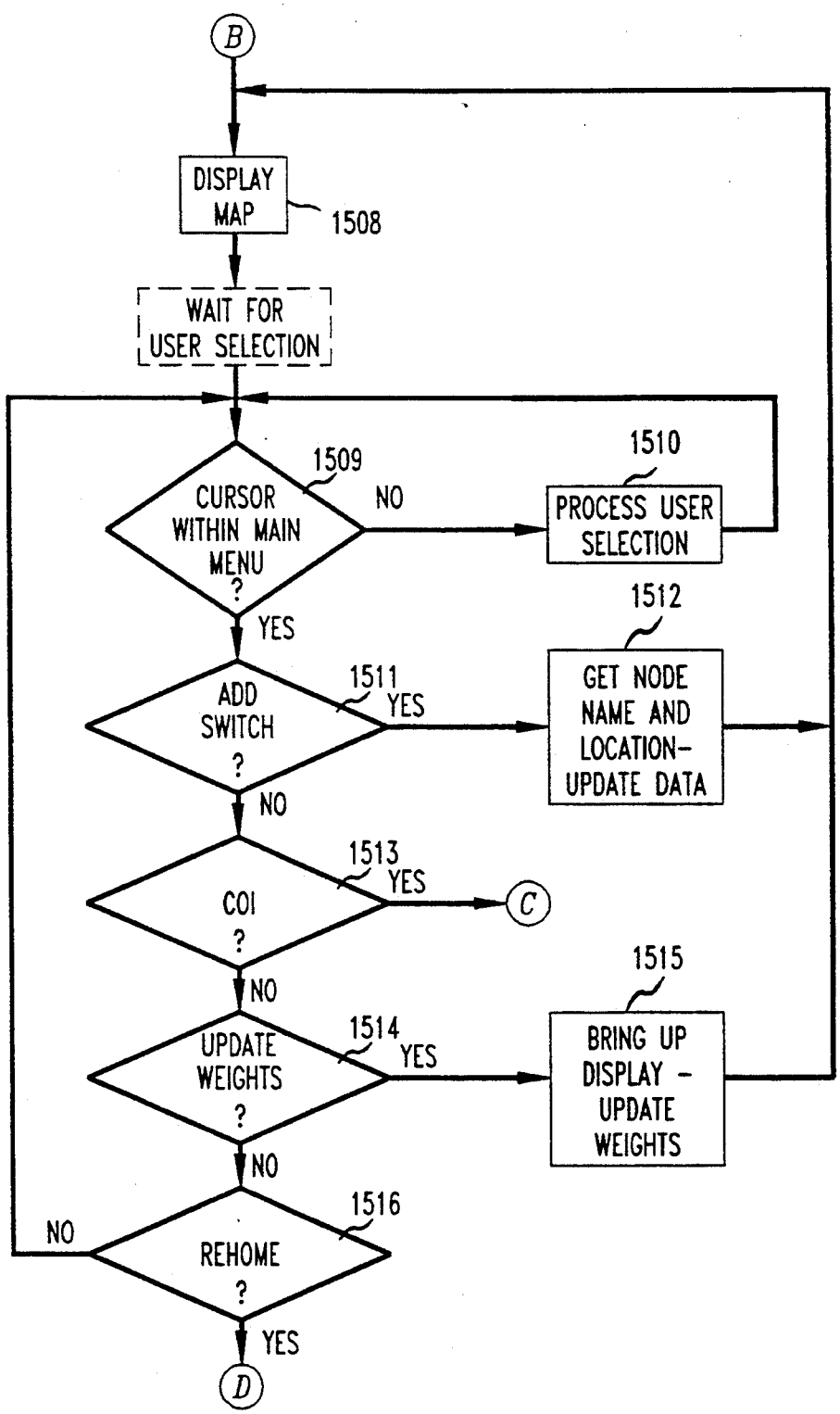

Turning then to FIG. 15, the program is entered at block 1500 where it proceeds to block 1501 to determine if mouse button 14a is pressed (operated). If that is not the case, then the program returns to the input branch of block 1501. Otherwise, the program proceeds to block 1502 to determine if mouse cursor 40 is pointing to Quit button 29 (FIG. 2). The program exits if indeed that is case. Otherwise, the program proceeds to block 1503 to determine if mouse cursor 40 is pointing to OK button 28, and proceeds to block 1508 (FIG. 16) if it finds that to be the case. Otherwise, the program proceeds to block 1504 to determine if mouse cursor 40 is pointing to one of the displayed data periods 21 through 24. The program proceeds to block 1505 if that is not case. Otherwise, the program proceeds to block 1506 where it (a) notes in internal memory the data period selected by the user, and (b) highlights the selected data period. The program then returns to block 1501 to await the next user input.

At block 1505, the program checks to see if mouse cursor 40 is pointing to one of the file windows 25 through 27, and proceeds to block 1507 if it finds that to be the case. Otherwise, the program proceeds to block 1501. At block 1507, the program highlights the selected file window and then waits for the user to input a file name. When the user enters such a name, the program records the name in internal memory and displays it in the selected window. The program then proceeds to block 1501 to await the next user input.

At block 1508 (FIG. 16), the program displays FIG. 3 and then waits for user input. The program proceeds to block 1509 upon detecting such input, and checks the input to see if cursor 40 is pointing to the main menu displayed in panel 305. The program proceeds to block 1511 if the cursor is found to be pointing at an object in the main menu. Otherwise, the program proceeds to block 1510 where it processes one of the other user selections, such as one of the buttons 43 through 46 of panel 306.

Figure 21:
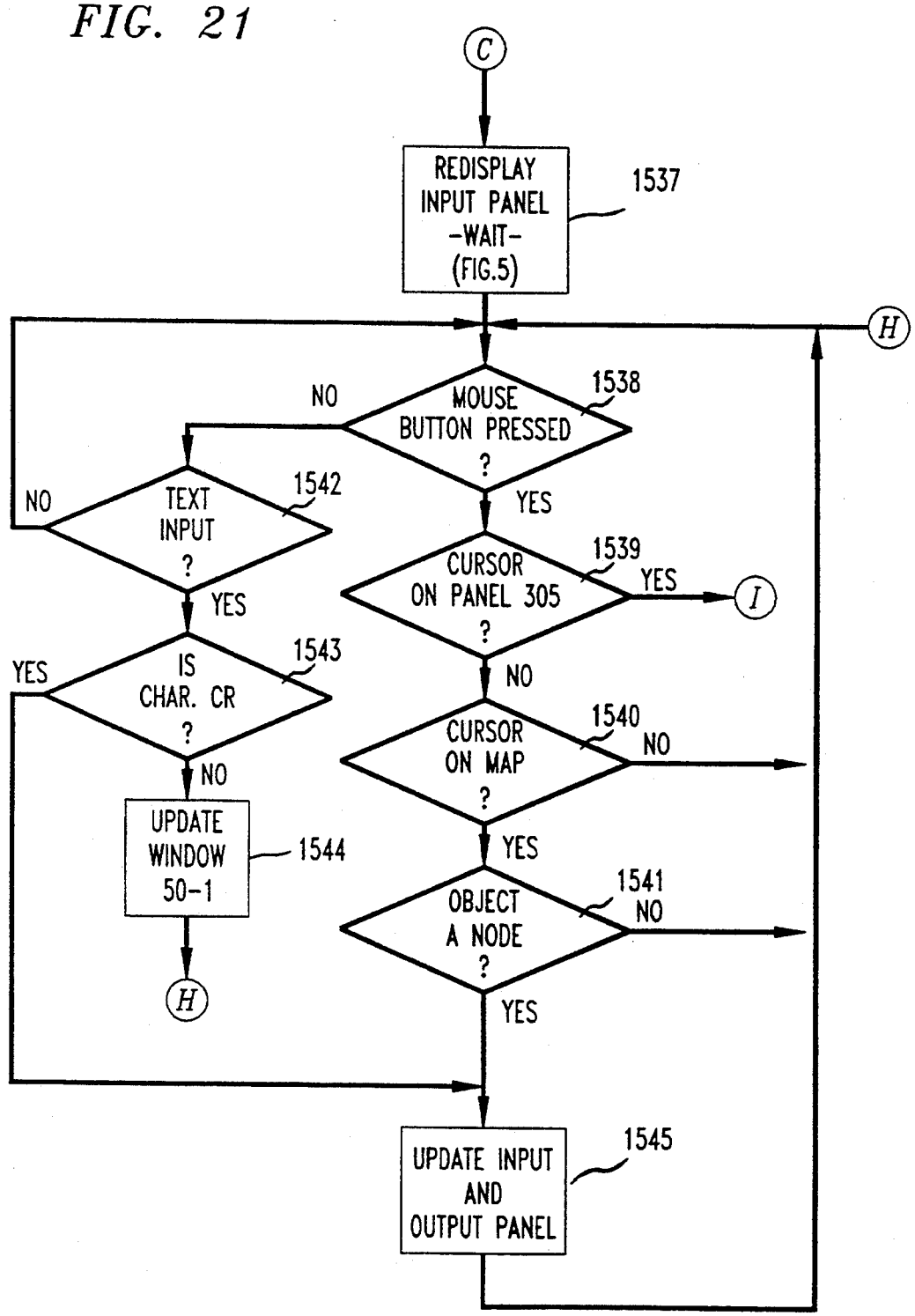

Blocks 1511 through 1516 are tests to determine if mouse cursor 40 is pointing to one of the buttons 38, 39, 41 or 42 displayed in panel 305. If any one the tests is found to be true, then the program goes on to process the selection via the respective YES branch. For example, at block 1512, the program stores in internal memory the name and location of the switch (concentration node) that is to be added to the network and updates the selected period data accordingly. The program then returns to block 1508. At block 1513, the program proceeds to block 1537 (FIG. 21) if the user selects COI button 39, and at block 1516 the program proceeds to block 1517 if the user selects Rehome button 38. Whereas, at block 1514, the program proceeds to block 1515 where it displays weight windows 91 through 95 shown in FIG. 9, and then enters the user's input into a selected window. The program returns to block 1508 when the user selects the displayed DONE button.

Figure 17:
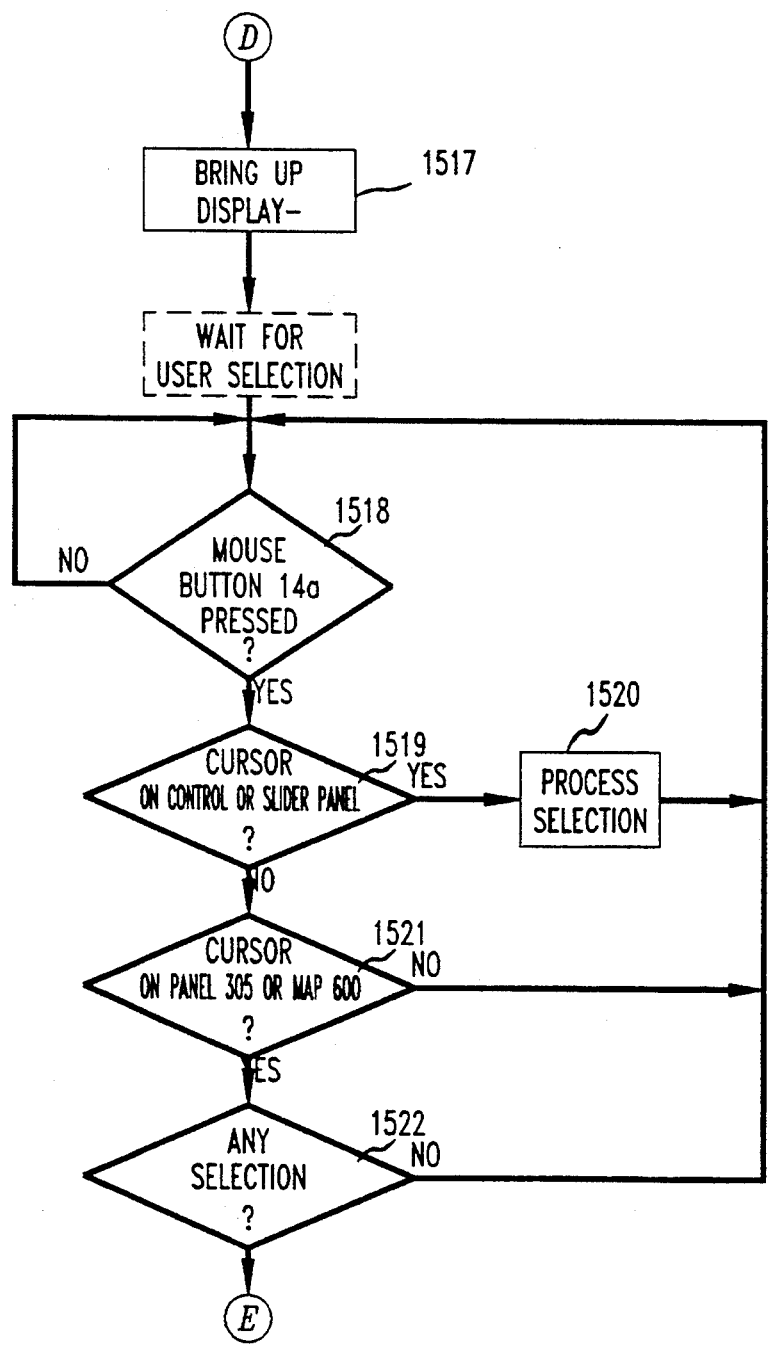

At block 1517 (FIG. 17), the program redisplays panel 305, as shown in FIG. 5, and then waits for user input, which causes the program to proceed to block 1518. At block 1518, the program checks to see if the user is pressing mouse button 14a and proceeds to block 1519 if that is the case. Otherwise, the program returns to the input branch of block 1518. At block 1519, the program checks to see if the mouse cursor is pointing to either control panel 306 or slider panel 302 and proceeds to block 1520 if that is the case. Otherwise, the program proceeds to block 1521. At block 1520, the program processes the user selection in the manner described above, and then returns to the input branch of block 1518.

Figure 18:
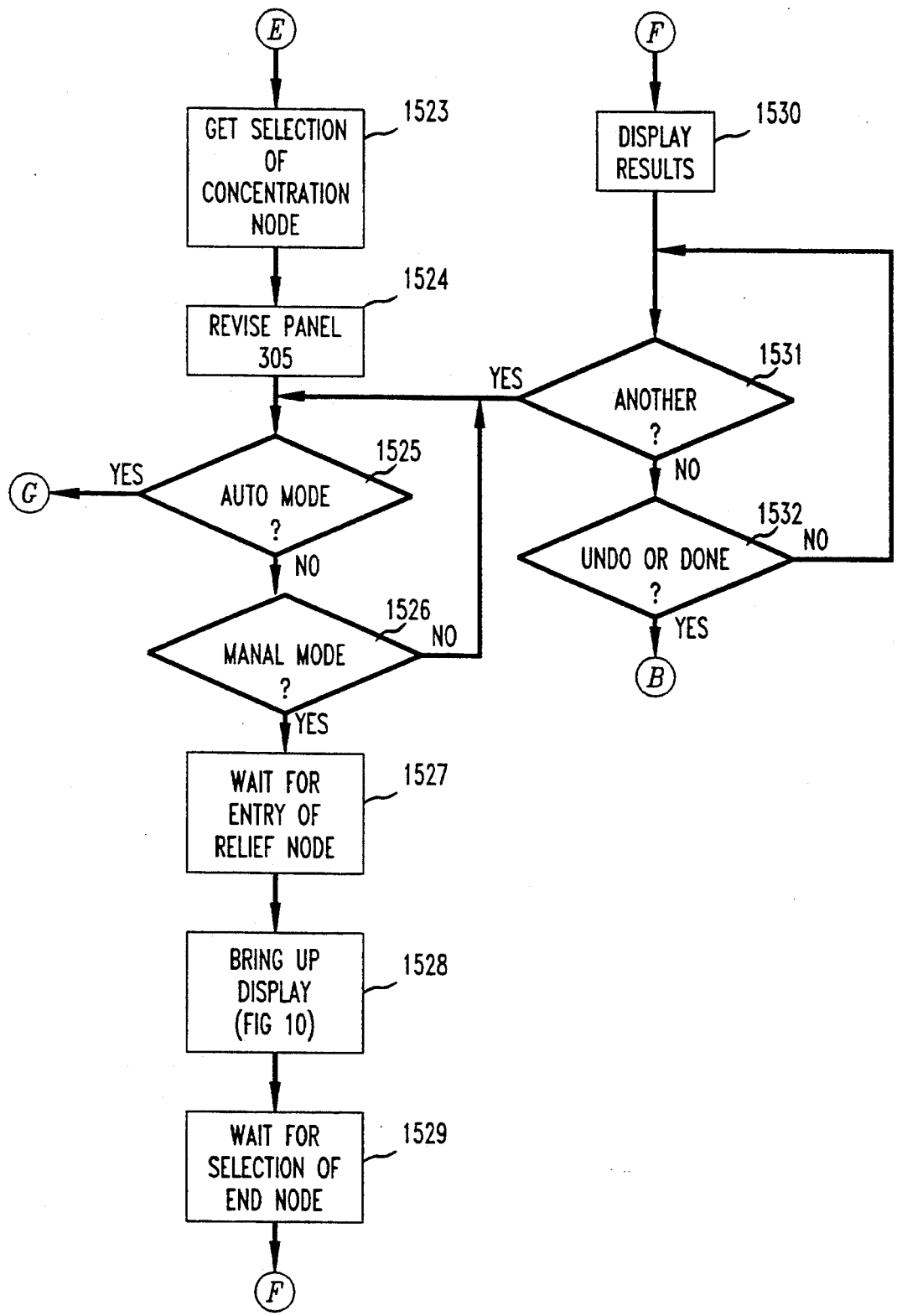

At block 1521, the program proceeds to block 1522 if it finds that mouse cursor 40 is pointing to either panel 305 or map 600. Otherwise, the program returns to block 1518. At block 1522, the program checks to see if (a) mouse cursor 40 is pointing to a displayed concentration node name in window 50-2 of panel 305 (FIG. 5), (b) mouse cursor 40 is pointing to a displayed symbol in map 600, or (c) the user is entering the identity of a selected concentration node via keyboard 13. If the program finds that none of the preceding cases are true, then it returns to block 1518. Otherwise, the program proceeds to block 1523 (FIG. 18) where it stores the identity of the selected concentration node in internal memory and then proceeds to block 1524. At block 1524, the program revises panel 305 to display the AUTO and MAN buttons 60-1 and 60-2, as shown in FIG. 6. The program then awaits for a user selection, and proceeds to block 1525 upon detecting such input.

Figure 19:
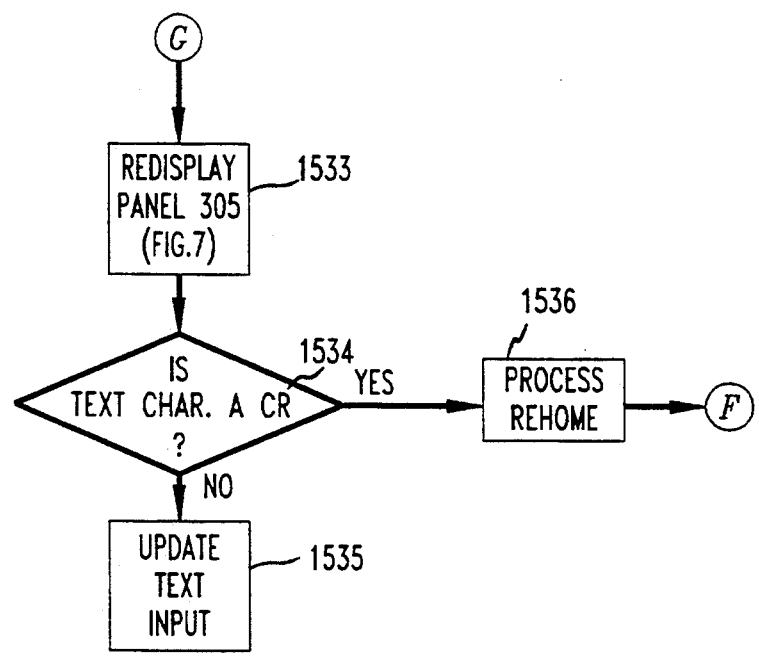

At block 1525, the program checks the input to determine if it is indicative of the user selecting AUTO button 60-1, and proceeds to block 1533 (FIG. 19) if the program finds that to be the case. Otherwise, the program proceeds to block 1526 to determine if the input is indicative of the user selecting MAN button 60-2, and proceeds to block 1527 if indeed that is the case. Otherwise, the program returns to block 1525 to await the next user input.

At block 1527, the program displays a request calling for the entry of the identity of the relief concentration node and then waits for the user's response. The program proceeds to block 1528 upon receipt of such identity. At block 1528, the program displays the selected concentration node, the associated subtending nodes and selected relief concentration node in the manner shown in FIG. 10. The program then proceeds to block 1529 where it waits for the user to select a subtending node that is to be rehomed to the relief concentration node, and proceeds to block 1530 upon the user making that selection. At block 1530, the program erases screen 11 and, for the manual mode, displays in map 600 the selected subtending node rehomed to the relief concentration node. For the manual mode, the program also displays in panel 304, and in the manner shown in FIG. 11, the statistical effect of the rehome on the relieved concentration node. (It is noted that if the program enters block 1530 via a program block associated with the AUTO mode, then the display would conform with that mode, as shown, for example, in FIG. 8.) Following the foregoing, the program then waits for the user to select one of the buttons 80-4 through 80-6 displayed in input panel 305. If the user selects button 80-4 (Another), then the program returns to block 1525 via block 1531. If, on the other hand, the user selects either button 80-5 (DONE) or button 80-6 (Undo) then the program returns to block 1508 via block 1532. It is noted that in the case of selecting the Undo button the program in returning to block 1508 also erases from the internal memory of computer 10 the results of the last rehome requested by the user.

Figure 20:
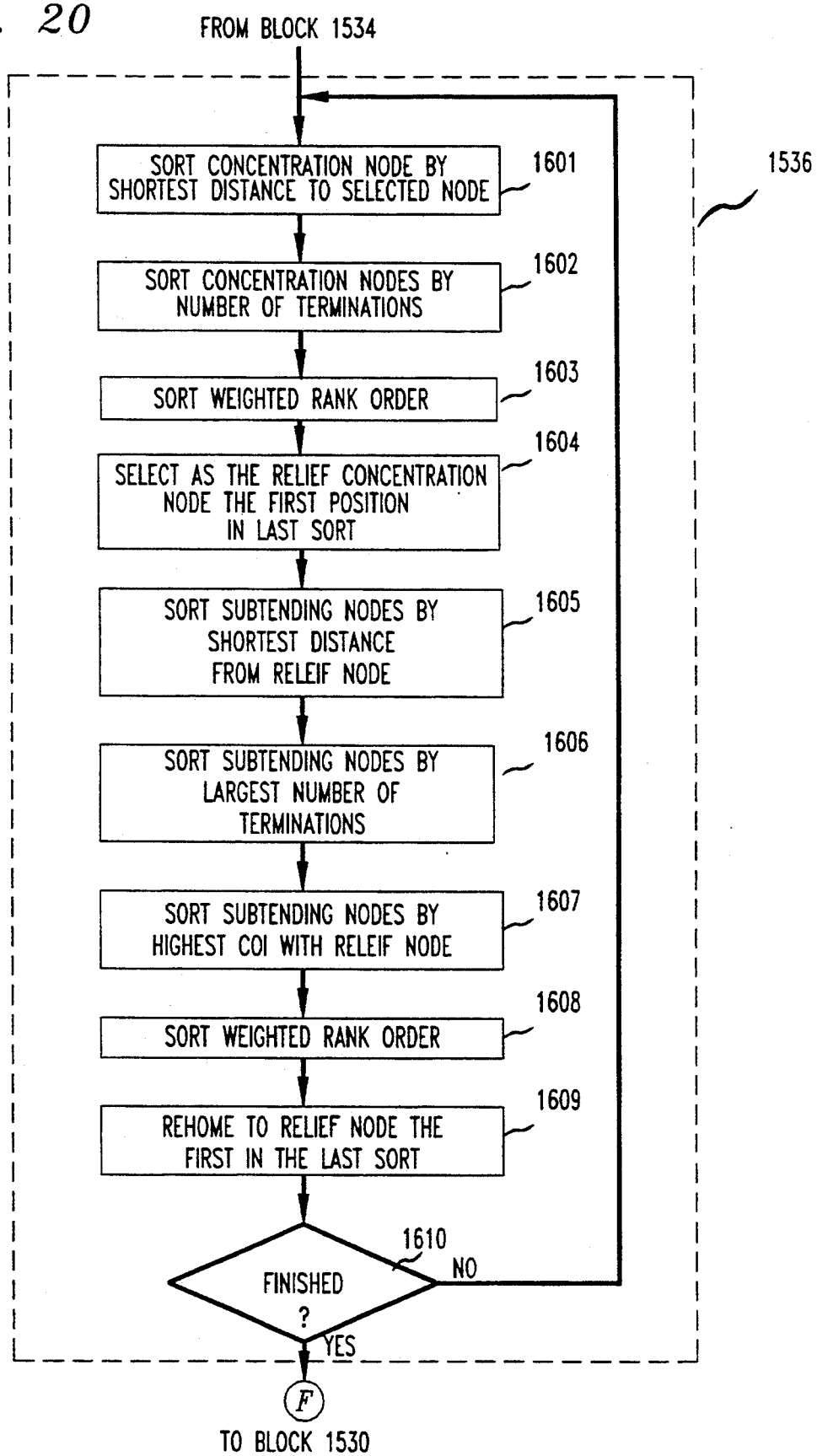

At block 1533 (FIG. 19), which, as mentioned above, is reached as a result of the user selecting the AUTO mode, the program erases input panel 305 and displays therein a request for the entry of the fraction by which the number of terminations at the selected concentration node is to be reduced. The program at blocks 1534 and 1535 accepts the user's typed input and displays the characters in window 70-1 of panel 305. The program proceeds to block 1536 when the user enters a carriage return (CR). At block 1536, the program automatically processes the rehomes and then displays the results at block 1530. An expanded version of block 1536 is shown in FIG. 20.

In particular, at block 1601, the program sorts all of the network concentration nodes by their respective distances (in terms of air miles) to the selected concentration node that is to be deloaded. As a result of the sort, the concentration node having the smallest distance is placed at the top of the list. At block 1602, the program sorts the concentration nodes by their respective number of terminations, in which the identity of the node having the least number of terminations migrates to the top of the list as result of the sort. At block 1603, the program sorts a weighted rank order of the lists calculated at blocks 1601 and 1602. That is, the program multiplies a node's position in the block 1601 list by the value of the distance weight 95 selected by the user at the time that FIG. 9 was displayed on screen 11. The program then sums the result of that calculation with the result obtained by multiplying the node's position in the block 1602 list by the value of the termination weight 94 priorly selected by the user. The program performs the foregoing for each of the network nodes and then sorts the results. At block 1604, the program selects as the relief concentration node the node which is at the top of the list obtained at block 1603. (It is noted that if the user does not select a weight in conjunction with FIG. 9, then the program uses a default weight of—illustratively 50.0—, as is shown in that FIG.)

At block 1605, the program sorts the identities of the associated subtending nodes by their respective distances to the relief node selected at block 1604, in which the subtending node having the shortest distance is placed at the top of the sorted list. At block 1606, the program sorts the identities of the associated subtending nodes by their respective load. The subtending node having the largest load is placed at the top of the list as a result of the sort. At block 1607, the program sorts the subtending nodes by their respective COI values in relation to the relief concentration node identified at block 1604, in which the subtending node having the highest such COI value is placed at the top of the list as a result of the sort. At block 1608, the program then sorts the subtending nodes by their weighted rank order in relation to the lists obtained at blocks 1605 through 1607, as was similarly done at block 1603 for the concentration nodes. At block 1609, the program rehomes to the relief concentration node selected at block 1604 the subtending node that is at the top of the weighted rank order list sorted at block 1608. At block 1610, the program checks to see if it has completed the task of deloading the selected concentration node by the fractional amount requested by the user, and proceeds to block 1530 to display the results of the automatic rehoming session if that is the case. Otherwise, the program returns to block 1601 to select the next relief concentration node and the subtending node that is to be rehomed.

Figure 22:
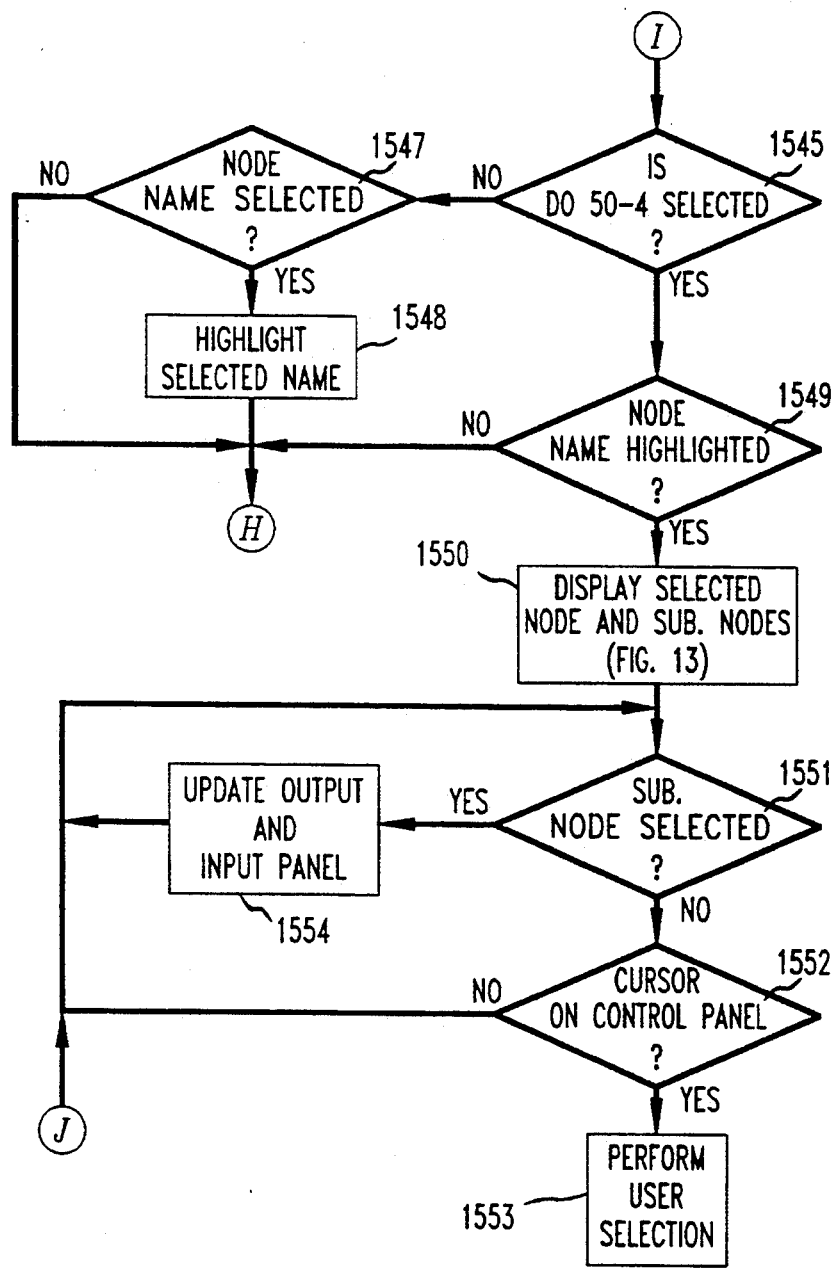

As mentioned above, the program proceeds to block 1537 (FIG. 21) when the user selects COI button 39. At block 1537, the program erases the contents of panel 305 and displays therein, in the manner shown in FIG. 4, the different classes of subtending nodes. When the user selects a particular class, then computer notes the selection, erases panel 305 and displays therein, in the manner shown in FIG. 5, the identities of the concentration nodes. The program then proceeds to block 1538, where it proceeds to block 1546 (FIG. 22) via block 1539 as a result of cursor 40 being on panel 305. If that is not the case, then the program checks, at block 1540, to see if the cursor is on map 600. If that is the case, then, at block 1541, the program checks to see if cursor 40 is pointing at the displayed symbol of a respective concentration node. If that is the case, then the program proceeds to block 1545 to update output and input panels 304 and 305, in the manner described above. The program then returns to block 1538 to await the selection of another concentration node or the possible selection of DO button 50-4.

As also mentioned above, the user may select a concentration node by typing in its identity using keyboard 13. Accordingly, the program at blocks 1542 through 1544 detects an inputted text character and displays the character in the order that it is detected in window 50-1 of panel 305 (FIG. 5). If the character happens to be a carriage return, then the program proceeds to block 1545 via block 1543.

At block 1546 (FIG. 22), the program checks to see if the user has selected DO button 50-4 and proceeds to block 1549 if that is the case. Otherwise, the program proceeds to block 1547 where it returns to block 1538 if it finds that mouse cursor 40 is not pointing to a name displayed in window 50-2 of panel 305. Otherwise, the program proceeds to block 1548 where it highlights the selected name and displays in output panel 304 the associated statistics. The program then returns to block 1538.

At block 1549, the program checks to see if the user has selected a concentration node and proceeds to block 1550 if that is the case. Otherwise, the program returns to block 1538 to await such a selection. At block 1550, the program displays, in the manner shown in FIG. 13, the selected concentration node and its associated subtending nodes. The program then proceeds to block 1551 to determine if the user has selected a particular one of the subtending nodes. If the program detects such a selection, then it proceeds to block 1554 where it updates output panel 304 to display, in the manner shown in FIG. 13, the COI statistics associated with the selected subtending node. The program then returns to block 1551 to wait for the selection of another subtending node. At block 1552, the program checks to see if the user has selected one of the buttons displayed in panel 306. The program proceeds to block 1553 if it finds that is the case. Otherwise, it returns to block 1551. At block 1553, the program processes the user selection, e.g., save, break, help or quit.

The foregoing is merely illustrative of the principles of our invention. Those skilled in the art will be able to devise numerous arrangements, which, although not explicitly shown or described herein, embody those principles that are within its spirit and scope. For example, as discussed herein subtending nodes were rehomed for a purpose of decreasing the number of terminations at an associated concentration node. It is apparent from the foregoing that such rehoming may be done for some other purpose, such as, for example, to improve either the real-time capacity or memory requirements of an associated concentration node.

We claim:

1. A dynamic graphics arrangement for use in a computer having a display, said display being employed to display data characterizing a predetermined network formed from a plurality of subtending nodes and a plurality of concentration nodes, said arrangement comprising means, responsive to receipt of a predetermined request inputted by a user of said computer, for displaying on said display a plurality of symbols representing respective ones of said subtending and concentration nodes, ones of said displayed subtending nodes being assigned to at least a first one of said displayed concentration nodes, said ones of said subtending nodes having respective traffic relationships with said first concentration node and with at least another second one of said concentration nodes, in which each of said traffic relationships is characterized by a respective level, means, responsive to said user selecting said first concentration node, for determining which ones of the subtending nodes have a higher level of said traffic relationship with said second concentration node than with said first concentration node and for then reassigning those of said ones of said subtending nodes having said higher level to said second node, and means for displaying on said display the effect of said reassignment.

2. The arrangement set forth in claim 1 wherein said means for determining includes means selectable by said user for causing said computer, rather than said user, to select one of said concentration nodes.

3. The arrangement set forth in claim 2 wherein said means for displaying includes means for displaying on said display a plurality of parameters each having a range of weights settable by said user, said computer using the value of the weight set by said user for each of said parameters to select which ones of said subtending nodes will be reassigned to the other concentration node that said computer selects.

4. The arrangement set forth in claim 3 wherein one of said parameters is said traffic relationship.

5. The arrangement set forth in claim 2 wherein said means for causing includes means for displaying a request for said user to enter a value indicative of the level by which said one concentration node is to be deloaded.

6. The arrangement set forth in claim 2 wherein said means for causing includes means for displaying on said display an auto button selectable by said user for invoking said means for causing.

7. The arrangement set forth in claim 1 wherein said arrangement further comprises means for displaying on said display text detailing the assignment of said ones of said subtending nodes to said second node.

8. The arrangement set forth in claim 1 wherein said arrangement further comprises means for displaying on said display information detailing the level of deloading that may be experienced by said first concentration node as a result of reassigning said ones of said subtending nodes to said second concentration node.

9. The arrangement set forth in claim 1 wherein said means for displaying includes means for displaying on said display a scrollable list identifying each of said concentration nodes, and wherein said user selects said first concentration node by highlighting the identity of said first concentration node when it is displayed in said scrollable list.

10. The arrangement set forth in claim 9 wherein said means for displaying said scrollable list includes means for displaying loading information on said display, including at least memory capacity, processor capacity and number of trunk terminations associated with said highlighted node.

11. A method of displaying on a display associated with a computer the effect of deloading a communications node, said display being employed to display data characterizing a predetermined network comprising a plurality of communications nodes including concentration and subtending nodes, said method comprising the steps of responding to receipt of a predetermined request inputted by a user of said computer by displaying on said display a plurality of symbols representing respective ones of said concentration and subtending nodes, each of said concentration nodes being associated with a plurality of said subtending nodes, said subtending nodes having predetermined traffic relationships with their associated concentration node and with at least another one of said concentration nodes, in which each of said traffic relationships is characterized by a respective level, responding to said user selecting one of said concentration nodes by determining which ones of the subtending nodes associated with said selected concentration node have a higher level of said traffic relationship with said at least one other concentration node than with said selected concentration node, and reassigning those of said ones of the subtending nodes having said higher level to said at least one other concentration node.

12. The method set forth in claim 11 wherein said step of determining includes the step of causing said computer, rather than said user, to select one of said nodes.

13. The method set forth in claim 12 wherein said step of displaying includes the step of displaying on said display a plurality of parameters each having a range of weights settable by said user, said computer using the value of the weight set by said user for each of said parameters to select which ones of said subtending nodes that will be assigned to the concentration node selected by said computer.

14. The method set forth in claim 13 wherein one of said settable parameters is said traffic relationship.

15. The method set forth in claim 12 wherein said step of causing includes the step of displaying a request for said user to enter a value indicative of the level by which said said computer selected concentration node is to be deloaded.

16. The method set forth in claim 12 wherein said step of causing includes the step of displaying on said display an auto button selectable by said user for invoking said means for causing.

17. The method set forth in claim 11 further comprising the step of displaying at a predetermined location on said display text detailing the assignment of said ones of said subtending nodes to said computer selected concentration node.

18. The method set forth in claim 11 wherein said method further comprises the step of displaying on said display information detailing t level of deloading that may be obtained at said selected concentration node as a result of reassigning said ones of said subtending nodes to said other concentration node.

19. The method set forth in claim 11 wherein said step of displaying includes the step of displaying on said display a scrollable list identifying each of said concentration nodes, and wherein said user selects said one concentration node by highlighting the identity of said one concentration node when it is displayed in said scrollable list.

20. The method set forth in claim 19 wherein said step of displaying said scrollable list includes the step of displaying loading information, including at least memory capacity, processor capacity and number of trunk terminations associated with said highlighted concentration node.

* * * * *